United States Patent
Lee et al.

(10) Patent No.: US 10,303,933 B2
(45) Date of Patent: May 28, 2019

(54) APPARATUS AND METHOD FOR PROCESSING A BEAUTY EFFECT

(71) Applicant: Samsung Electronics Co., Ltd., Gyeonggi-do (KR)

(72) Inventors: Woo Yong Lee, Gyeonggi-do (KR); Dong Hoon Jang, Gyeonggi-do (KR); Dae Hyun Sung, Gyeonggi-do (KR); Dae Hun An, Gyeonggi-do (KR); Jong Hoon Won, Gyeonggi-do (KR); Ki Huk Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 113 days.

(21) Appl. No.: 15/658,058

(22) Filed: Jul. 24, 2017

(65) Prior Publication Data

US 2018/0032797 A1 Feb. 1, 2018

(30) Foreign Application Priority Data

Jul. 29, 2016 (KR) .................. 10-2016-0096577

(51) Int. Cl.
*G06K 9/00* (2006.01)

(52) U.S. Cl.
CPC ..... *G06K 9/00288* (2013.01); *G06K 9/00221* (2013.01); *G06K 9/00228* (2013.01); *G06K 9/00268* (2013.01); *G06K 9/00275* (2013.01)

(58) Field of Classification Search
CPC .......... G06K 9/00288; G06K 9/00228; G06K 9/00275; G06K 9/00221; G06K 9/00268; G06K 9/00248; G06T 2207/30201; G06T 2207/30088; G06T 2207/10024; G06T 5/00; G06T 5/003; H04N 5/23219; H04N 5/23229; H04N 9/643

See application file for complete search history.

(56) References Cited

U.S. PATENT DOCUMENTS

| | | | |
|---|---|---|---|
| 7,092,573 | B2 | 8/2006 | Luo et al. |
| 7,574,016 | B2 | 8/2009 | Steinberg et al. |
| 7,634,109 | B2 | 12/2009 | Steinberg et al. |
| 7,809,162 | B2 | 10/2010 | Steinberg et al. |
| 7,844,076 | B2 | 11/2010 | Corcoran et al. |
| 7,848,549 | B2 | 12/2010 | Steinberg et al. |
| 7,853,043 | B2 | 12/2010 | Steinberg et al. |
| 7,860,274 | B2 | 12/2010 | Steinberg et al. |

(Continued)

FOREIGN PATENT DOCUMENTS

EP 1 318 475 6/2003

OTHER PUBLICATIONS

International Search Report dated Oct. 20, 2017 issued in counterpart application No. PCT/KR2017/007528, 8 pages.

*Primary Examiner* — Michael S Osinski
(74) *Attorney, Agent, or Firm* — The Farrell Law Firm, P.C.

(57) ABSTRACT

Disclosed is a beauty effect processing apparatus that increases the effectiveness of a beauty effect applied to a face included in an image frame by selecting a protagonist, to which the beauty effect having a maximum sharpness is to be applied, from at least one received face image, and determining a beauty level corresponding to sharpness of the beauty effect to be applied to the received at least one face image based on at least one of a spaced distance from the protagonist and a face size of the received at least one face image relative to a face size of the protagonist.

20 Claims, 13 Drawing Sheets

(56) References Cited

U.S. PATENT DOCUMENTS

| | | | |
|---|---|---|---|
| 7,916,897 B2* | 3/2011 | Corcoran | G06K 9/00228 382/103 |
| 8,014,567 B2 | 9/2011 | Yoon et al. | |
| 8,031,961 B2* | 10/2011 | Nachlieli | G06T 5/003 382/190 |
| 8,055,090 B2 | 11/2011 | Steinberg et al. | |
| 8,077,931 B1* | 12/2011 | Chatman | G06T 7/0012 382/118 |
| 8,121,430 B2 | 2/2012 | Corcoran et al. | |
| 8,126,208 B2 | 2/2012 | Steinberg et al. | |
| 8,131,016 B2 | 3/2012 | Steinberg et al. | |
| 8,224,108 B2 | 7/2012 | Steinberg et al. | |
| 8,331,715 B2 | 12/2012 | Steinberg et al. | |
| 8,369,586 B2 | 2/2013 | Corcoran et al. | |
| 8,498,452 B2 | 7/2013 | Steinberg et al. | |
| 8,570,391 B2 | 10/2013 | Shimamura et al. | |
| 8,649,612 B1 | 2/2014 | Brunner | |
| 8,786,760 B2* | 7/2014 | Yu | G03B 13/36 348/345 |
| 8,908,932 B2 | 12/2014 | Corcoran et al. | |
| 8,989,453 B2 | 3/2015 | Steinberg et al. | |
| 8,989,455 B2 | 3/2015 | Shor et al. | |
| 9,025,050 B2* | 5/2015 | Lee | H04N 5/23219 348/223.1 |
| 9,516,217 B2 | 12/2016 | Corcoran et al. | |
| 9,589,177 B2 | 3/2017 | Shor et al. | |
| 9,818,023 B2 | 11/2017 | Shor et al. | |
| 10,152,778 B2* | 12/2018 | Chen | G06K 9/00268 |
| 2003/0065524 A1* | 4/2003 | Giacchetti | A45D 44/005 700/49 |
| 2003/0108250 A1 | 6/2003 | Luo et al. | |
| 2004/0207743 A1* | 10/2004 | Nozaki | H04N 5/23212 348/333.12 |
| 2004/0228528 A1* | 11/2004 | Lao | G06K 9/00221 382/167 |
| 2005/0278636 A1* | 12/2005 | Nomoto | G06T 5/00 715/724 |
| 2006/0204055 A1 | 9/2006 | Steinberg et al. | |
| 2007/0110305 A1 | 5/2007 | Corcoran et al. | |
| 2007/0189627 A1* | 8/2007 | Cohen | G06K 9/00228 382/254 |
| 2008/0013787 A1* | 1/2008 | Kobayashi | G06K 9/00255 382/103 |
| 2008/0019589 A1 | 1/2008 | Yoon et al. | |
| 2008/0187184 A1* | 8/2008 | Yen | G06T 5/008 382/118 |
| 2008/0285817 A1* | 11/2008 | Imamura | H04N 5/232 382/118 |
| 2009/0016645 A1* | 1/2009 | Sako | G06T 11/60 382/298 |
| 2009/0052749 A1 | 2/2009 | Steinberg et al. | |
| 2009/0052750 A1 | 2/2009 | Steinberg et al. | |
| 2009/0087030 A1 | 4/2009 | Steinberg et al. | |
| 2009/0087042 A1 | 4/2009 | Steinberg et al. | |
| 2010/0054533 A1 | 3/2010 | Steinberg et al. | |
| 2010/0054549 A1 | 3/2010 | Steinberg et al. | |
| 2010/0092039 A1 | 4/2010 | Steinberg et al. | |
| 2010/0157084 A1 | 6/2010 | Shimamura et al. | |
| 2010/0158403 A1* | 6/2010 | Mitsuya | G06T 3/4053 382/255 |
| 2011/0002545 A1 | 1/2011 | Steinberg et al. | |
| 2011/0013043 A1 | 1/2011 | Corcoran et al. | |
| 2011/0019029 A1* | 1/2011 | Matsumoto | H04N 5/232 348/223.1 |
| 2011/0075894 A1 | 3/2011 | Steinberg et al. | |
| 2011/0075895 A1 | 3/2011 | Steinberg et al. | |
| 2011/0096187 A1 | 4/2011 | Steinberg et al. | |
| 2012/0120304 A1 | 5/2012 | Corcoran et al. | |
| 2012/0229694 A1 | 9/2012 | Steinberg et al. | |
| 2013/0027569 A1* | 1/2013 | Parulski | H04N 5/232 348/207.1 |
| 2013/0202161 A1 | 8/2013 | Shor et al. | |
| 2013/0236052 A1 | 9/2013 | Corcoran et al. | |
| 2014/0147003 A1* | 5/2014 | Li | G06K 9/00234 382/103 |
| 2015/0193649 A1 | 7/2015 | Shor et al. | |
| 2015/0242982 A1* | 8/2015 | Choi | H04N 5/23293 382/106 |
| 2016/0014333 A1 | 1/2016 | Corcoran et al. | |
| 2016/0117829 A1* | 4/2016 | Yoon | G06T 7/50 348/222.1 |
| 2016/0119503 A1* | 4/2016 | Yamada | H04N 1/4092 358/3.27 |
| 2016/0125228 A1* | 5/2016 | Son | G06F 19/345 382/118 |
| 2017/0076474 A1* | 3/2017 | Fu | G06T 11/00 |
| 2017/0132456 A1 | 5/2017 | Shor et al. | |
| 2018/0174370 A1* | 6/2018 | Chen | G06T 7/90 |
| 2018/0286097 A1* | 10/2018 | Wang | G06K 9/00288 |
| 2018/0350046 A1* | 12/2018 | Sasaki | G06T 5/008 |

* cited by examiner

APPARATUS AND METHOD FOR PROCESSING A BEAUTY EFFECT

PRIORITY

This application claims priority under 35 U.S.C. § 119(a) to a Korean Patent Application filed in the Korean Intellectual Property Office on Jul. 29, 2016 and assigned Serial Number 10-2016-0096577, the contents of which are incorporated herein by reference.

BACKGROUND

1. Field of the Disclosure

The present disclosure relates generally to an image processing technology, and more particularly, to an apparatus and a method for processing a beauty effect by differently applying the beauty effect to each image frame.

2. Description of the Related Art

Generally, an image sensor, such as a charge-coupled device (CCD) image sensor or a complementary metal oxide semiconductor (CMOS) image sensor) of a digital image processing device photographs with a very high emphasis on accounting for such small matter as faint spots and stains. Since the digital image processing device also emphasizes accounting for small color differences of the skin of a subject, a user of the digital image processing device may not have a complexion that can satisfy the image result.

The digital image processing device supports a beauty processing mode in which a part of the face lacking visual appeal and included in the photographed image is softened. For example, the digital image processing device may apply a beauty effect in a batch to all the faces included in the photographed image. In this case, the beauty effect applied to the subject (a protagonist) to which the beauty effect actually needs to be applied may be insufficient.

As such, there is a need in the art for a method that improves the processing of the image effect in each image frame of an image processing device.

SUMMARY

Aspects of the present disclosure are to address at least the above-mentioned problems and/or disadvantages and to provide at least the advantages described below. Accordingly, an aspect of the present disclosure is to provide a device and a method for processing a beauty effect that is capable of increasing the beauty effect of at least one subject included in each image frame.

In accordance with an aspect of the present disclosure, a beauty effect processing apparatus includes an excluded subject detecting unit configured to select a subject to be excluded, to which no beauty effect is applied, of at least one face image extracted from each of image frames, a protagonist selecting unit configured to receive at least one face image other than the subject to be excluded among the at least one extracted face image and to select a protagonist, to which the beauty effect having a maximum sharpness is to be applied, among the received at least one face image, and a beauty level determining unit configured to determine a beauty level corresponding to sharpness of the beauty effect to be applied to each of the received at least one face image based on at least one of a spaced distance from the protagonist and a face size of the received at least one face image relative to a face size of the protagonist.

In accordance with an aspect of the present disclosure, a beauty effect processing method by at least one processor includes selecting a subject to be excluded, to which no beauty effect is applied, of a subject included in a face image extracted from each of image frames, receiving at least one face image other than the subject to be excluded among the extracted face image, selecting a protagonist, to which the beauty effect having a maximum sharpness is to be applied, of the received at least one face image, and determining a beauty level corresponding to sharpness of the beauty effect to be applied to the received at least one face image based on at least one of a spaced distance from the protagonist and a face size of the received at least one face image relative to a face size of the protagonist.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
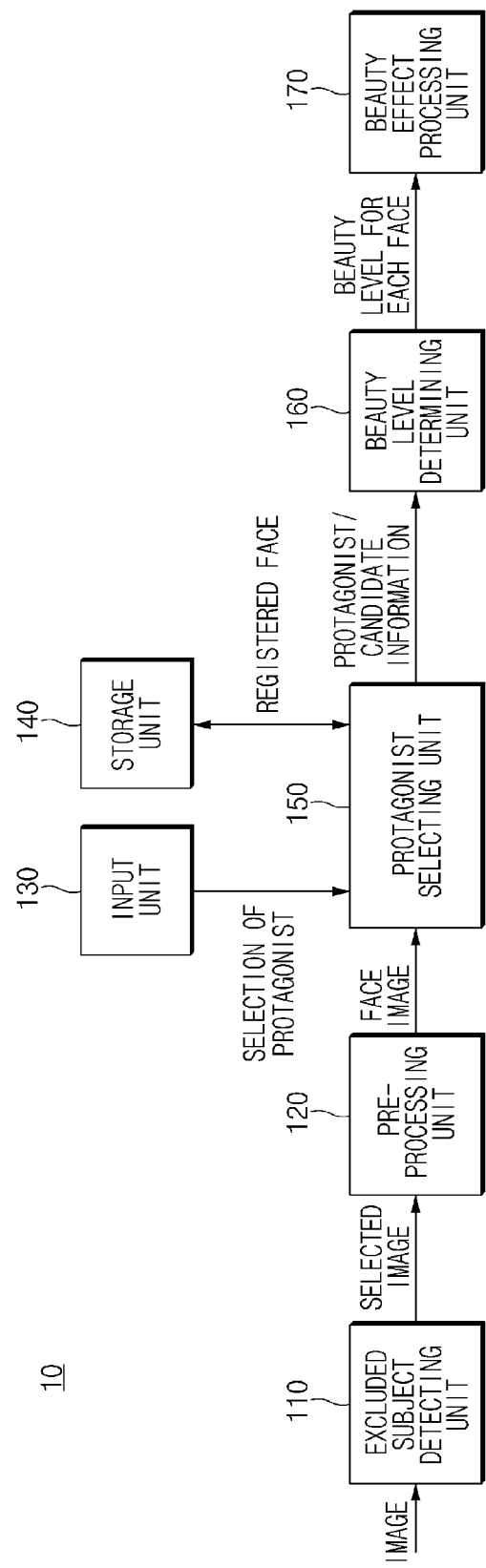
FIG. 1 illustrates a beauty effect processing apparatus, according to an embodiment of the present disclosure.

Embodiments of the present disclosure may be described with reference to accompanying drawings. It should be understood that there is no intent to limit the present disclosure to the particular embodiments disclosed, but instead, the present disclosure covers all modifications, equivalents, and alternatives falling within the spirit and scope of the present disclosure. Descriptions of well-known functions and/or configurations will be omitted for the sake of clarity and conciseness.

In the drawings, similar elements may be denoted by similar reference numerals. The terms of a singular form may include plural forms unless otherwise specified. Expressions such as "A or B" and "at least one of A and/or B" used herein may include any and all combinations of one or more of the associated listed items. Terms such as "first" and "second" may refer to various elements regardless of the order or priority of the elements and may be used to distinguish elements from each other, but not to limit the elements. It will be understood that when an element, such as a first element, is referred to as being operatively or communicatively coupled with/to or connected to another element, such as a second element, the first element can be directly coupled with/to or connected to the second element or an intervening element, such as a third element, may exist therebetween.

According to the situation, the expression "configured to" used herein may be interchangeably used as the expression "suitable for", "having the capacity to", "adapted to", "made to", "capable of", or "designed to" in hardware or software. Instead, the expression "a device configured to" may indicate that the device is "capable of" operating together with another device or other components. Herein, a central processing unit (CPU), or a "processor configured to perform A, B, and C" may indicate a dedicated processor for performing a corresponding operation or an application processor which may perform corresponding operations by executing one or more software programs which are stored in a memory device.

An electronic device according to embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, medical devices, cameras, or wearable devices such as an accessory type including a timepiece, a ring, a bracelet, an anklet, a necklace, glasses, a contact lens, or a head-mounted-device (HMD), one-piece fabric or clothes type of a device, such as electronic clothes, a body-attached type of a device, such as a skin pad or a tattoo, or a bio-implantable circuit.

According to embodiments, the electronic device may include at least one of televisions (TVs), digital versatile disc (DVD) players, audios, refrigerators, air conditioners, cleaners, ovens, microwave ovens, washing machines, air cleaners, set-top boxes, home automation control panels, security control panels, media boxes, such as Samsung HomeSync™, Apple TV™, or Google TV™), game consoles, such as Xbox™ or PlayStation™, electronic dictionaries, electronic keys, camcorders, electronic picture frames, and the like.

According to another embodiment, the electronic device may include at least one of various portable medical measurement devices, such as a blood glucose monitoring device, a heartbeat measuring device, a blood pressure measuring device, and a body temperature measuring device, a magnetic resonance angiography (MRA) device, a magnetic resonance imaging (MRI) device, a computed tomography (CT) device, scanners, and ultrasonic devices, navigation devices, global navigation satellite systems (GNSSs), event data recorders (EDRs), flight data recorders (FDRs), vehicle infotainment devices, electronic equipment for vessels, such as navigation systems and gyrocompasses, avionics, security devices, head units for vehicles, industrial or home robots, drones, automated teller machines (ATMs), points of sales (POSs) devices, or Internet of Things (IoT) devices, such as light bulbs, various sensors, sprinkler devices, fire alarms, thermostats, street lamps, toasters, exercise equipment, hot water tanks, heaters, and boilers.

According to an embodiment, the electronic devices may include at least one of parts of furniture, buildings/structures or vehicles, electronic boards, electronic signature receiving devices, projectors, or various measuring instruments, such as water meters, electricity meters, gas meters, or wave meters.

According to embodiments, the electronic device may be a flexible electronic device or a combination of two or more of devices among the above-described devices, but may not be limited to the above-described electronic devices. The term "user" used herein may refer to a person who uses an electronic device or to an artificial intelligence electronic device that uses an electronic device.

FIG. 1 illustrates a beauty effect processing apparatus, according to an embodiment of the present disclosure.

As illustrated in FIG. 1, a beauty effect processing apparatus 10 may include an excluded subject detecting unit 110, a pre-processing unit 120, an input unit 130, a storage unit 140, a protagonist selecting unit 150, a beauty level determining unit 160, and a beauty effect processing unit 170. According to an embodiment, the excluded subject detecting unit 110, the pre-processing unit 120, the protagonist selecting unit 150, the beauty level determining unit 160, and the beauty effect processing unit 170 may be included in one or more processors, such that functions of these units may be performed by the one or more processors.

According to an embodiment, if an image frame is input, the excluded subject detecting unit 110 may determine whether a specified subject to be excluded is included in the image frame. The input image frame may be a photographed image frame (i.e., still image) or preview image frame. The subject to be excluded may be a subject to which the beauty effect is not to be applied, and may include at least one of a subject of which the movement greater than or equal to a critical movement occurs, a blurred subject, and a subject of which the face does not face a camera, which are included in each image frame.

The excluded subject detecting unit 110 may verify the movement of each subject included in the image frame using a difference between a previous image frame and a current image frame in a preview image. The excluded subject detecting unit 110 may select a subject, of which the movement is greater than or equal to the critical movement, from among verified subjects as the subject to be excluded. The critical movement is defined as a movement which may cause blurring in the photographed image during photographing, and may be experimentally determined.

The excluded subject detecting unit 110 may verify an edge change between a previous image frame and the current image frame in the preview image, based on a change in at least one of contrast and sharpness of an edge. The excluded subject detecting unit 110 may select a subject, in which the verified edge change is greater than or equal to the critical change, as the subject to be excluded.

The excluded subject detecting unit 110 may select the subject to be excluded based on the direction of a face included in the input image frame (or a face image). For example, if two eyes are not detected in each face image, the excluded subject detecting unit 110 may determine the subject to be excluded as a subject that is not looking at the camera, and may select the determined subject as the subject to be excluded. As another example, when the width and height length of a face in a viewfinder is less than a specific critical value, the excluded subject detecting unit 110 may select the face as the subject to be excluded. As another example, the excluded subject detecting unit 110 may select the face, which is outside of an area specified by a user, as the subject to be excluded, such that the beauty effect is applied to the specified area.

The excluded subject detecting unit 110 may not transmit an image frame, in which the subject to be excluded is included, to the pre-processing unit 120 excluded subject, but may transmit to the pre-processing unit 120 only the image frame in which a specified subject to be excluded is not included.

The pre-processing unit 120 may extract all faces included in the image frame received from the excluded subject detecting unit 110, such as by using a face feature including at least one of an eye, a nose, and a mouth.

The pre-processing unit 120 may generate at least one face image including each extracted face, such as by cutting all the faces included in the received image frame in a specified shape. As another example, the pre-processing unit 120 may generate a face image including all faces by cutting at least part of the image frame such that all face areas are included in the received image frame. For conciseness, the former case where each face image includes one face will be described in the present disclosure.

When the face is not detected from the received image frame, the pre-processing unit 120 may not output the face image corresponding to the received image frame. The pre-processing unit 120 may determine the face image including the face, of which the size is less than the critical size, among the generated face images as a subject to be excluded, and may not output the face image. For example, the critical size may be a degree of a size where the effect is virtually indistinguishable by the user even though the beauty effect is applied thereto, and may be experimentally set using a test result obtained by applying the beauty effect to a face while the size of the face included in each image frame is changed.

If the total number of face images extracted from the received image frame is greater than critical number, the pre-processing unit 120 may determine the received image frame as the subject to be excluded. For example, the critical number may be the maximum number of faces that the beauty effect processing unit 170 is capable of processing, or may be the number of faces where the beauty effect is virtually indistinguishable by the user even though the beauty effect is applied thereto, and may be experimentally determined. The beauty effect may not be applied to the image frame including faces of which the number is greater than the critical number. In this case, if the number of faces processed in a batch by the beauty effect processing unit 170 is restricted, the effectiveness of the beauty effect may be improved.

The input unit 130 may provide a user interface for setting at least one of whether the beauty effect is applied to each image frame, selection of a face to which the beauty effect is applied, from among faces, and registration of the face to which the beauty effect is to be applied. For example, if the user selects a function of applying the beauty effect to the preview image or the photographed image, the input unit 130 may provide a user interface to set the beauty effect to be applied to a preview image or photographed image.

The storage unit 140 may be a volatile memory, such as random access memory (RAM), a nonvolatile memory, such as read only memory (ROM) or a flash memory or a combination thereof. For example, the storage unit 140 may store instructions or data associated with at least one other element(s) of the beauty effect processing apparatus 10.

The protagonist selecting unit 150 may determine a protagonist of the detected faces by using at least one of a face selected in real time through the input unit 130, the registered face, the size of each face image, and the distance from a camera. For example, the protagonist may be a subject to which the greatest beauty effect is applied.

The protagonist selecting unit 150 may determine whether the registered face is in the received face image, and if the registered face is present, may determine the protagonist of the registered faces. For example, the protagonist selecting unit 150 may select a face image, which is the closest to the camera or of which the face image size is the greatest, from among the verified registration faces as the protagonist.

According to another embodiment, the protagonist selecting unit 150 may select the face, which is selected by the user from the received face image, as the protagonist, such as by selecting a specific face from the preview image or the photographed image.

According to another embodiment, when there is no registered face image in the received face image, the protagonist selecting unit 150 may select the protagonist based on at least one of the distance from the camera or the face size, as described above.

If depth information corresponding to the face image is present, the protagonist selecting unit 150 may select the protagonist based at least on depth information corresponding to each face image. If the depth information corresponding to the face image is not present, the protagonist selecting unit 150 may select the protagonist based at least on the face size. For example, the depth information may be included in the face image extracted from the image frame photographed using two cameras, such as an infrared camera and a front or rear camera or a dual camera. As another example, the depth information may be measured by a depth sensor during photographing of the image frame, and thus the depth information may be associated with each image frame.

The protagonist selecting unit 150 may be driven in saving manner that conserves power. For example, when the protagonist selecting unit 150 does not receive the face image, the protagonist selecting unit 150 may operate in a standby mode, and only operate in a driving mode when receiving the face image.

The beauty level determining unit 160 may determine the beauty level of each face image. For example, the beauty level determining unit 160 may determine the beauty level of which the beauty effect is the greatest, with respect to the protagonist, based on the face size or a relative distance from the protagonist with respect to faces other than the protagonist. For example, if the composition of each face image is of a horizontal line, the beauty level determining unit 160 may determine the beauty level based on the depth information or the size of each face image. The composition of the horizontal line may be where the face images on the image frame placed at a certain distance to a camera are substantially similar. As another example, if the composition of each face image is not the composition of the horizontal line, the beauty level determining unit 160 may determine the beauty level based on the relative distance from the protagonist, which is based on x- and y-coordinates on the image frame of each face image.

The beauty effect processing unit 170 may apply the beauty effect to each face, such as by processing at least one of whitening, smoothing, and slimming with respect to each face area.

The beauty effect processing unit 170 may process at least one of whitening, smoothing, and slimming with respect to each of face areas with different sharpness according to the beauty level for each face. Smoothing may be the processing of softening and brightening an image by removing detailed parts from each face, such as by a blurring process using a low-pass filter or a Gaussian blur filter that averages the values of the pixels.

The pre-processing unit 120 may not select the image frame including faces, of which the number is greater than the critical number, as the excluded subject. In this case, the beauty effect processing unit 170 may adjust the sharpness of the beauty effect with respect to the image frame including the faces of which the number is greater than the critical number. For example, the beauty effect processing unit 170 may set the beauty effect to be less particular overall with respect to the faces of which the number is greater than the critical number, or may not apply the beauty effect to these faces.

As described above, the beauty effect processing apparatus 10 may support a function of registering a face to which the beauty effect is applied. The user may select the face to be registered, by dragging a specific area in a preview screen or in a frame of the photographed image. In this case, the pre-processing unit 120 may extract a face image including the face selected by the user in each image frame. The classification unit 151, which resides in the protagonist selecting unit 150 and will be described with reference to FIG. 2A, may extract the feature value of each face image from the selected face area and may store the extracted feature value as the registered face information in the storage unit 140.

According to another embodiment, the beauty effect processing apparatus 10 may further include a priority selecting unit which may verify the priority of the registered face selected through the input unit 130, may correlate the feature value of each face image with the priority of the registered face, and may store the correlated priority of the registered face in the storage unit 140.

According to another embodiment, at least one of the pre-processing unit 120, the protagonist selecting unit 150, and the beauty level determining unit 160 may exclude a face image that does not face the camera and a face image having a size that is less than the critical size, in the face image from the subject to which the beauty effect is applied, instead of the excluded subject detecting unit 110. When the face image excluded from the subject to which the beauty effect is applied is present, the beauty effect processing apparatus 10 may notify the user that no beauty effect is applied thereto.

According to another embodiment, the excluded subject detecting unit 110 may further detect an excluded subject to which no beauty effect is applied, by receiving the detected face image. For example, the excluded subject detecting unit 110 may verify protagonist information selected by the protagonist selecting unit 150 and may detect the excluded subject, to which no beauty effect is applied, based on the protagonist. The excluded subject detecting unit 110 may detect a face that has a relative distance that is far away from the protagonist, such as a face that is unintentionally photographed, as a subject to be excluded.

The effectiveness of the beauty effect may be improved by selecting a protagonist face, who best exudes or presents the applied beauty effect, from among of the photographed image or the preview image such that a maximum beauty effect sharpness is applied to the protagonist face.

Regarding the face of the subject in which blurring occurs or of which each face image frame movement is substantial, even though the beauty effect is applied thereto, it is possible to prevent an unnecessary beauty effect from being applied to the excluded face having low user satisfaction by applying beauty effect, and an unnecessary arithmetic operation may be reduced.

Figure 2A:
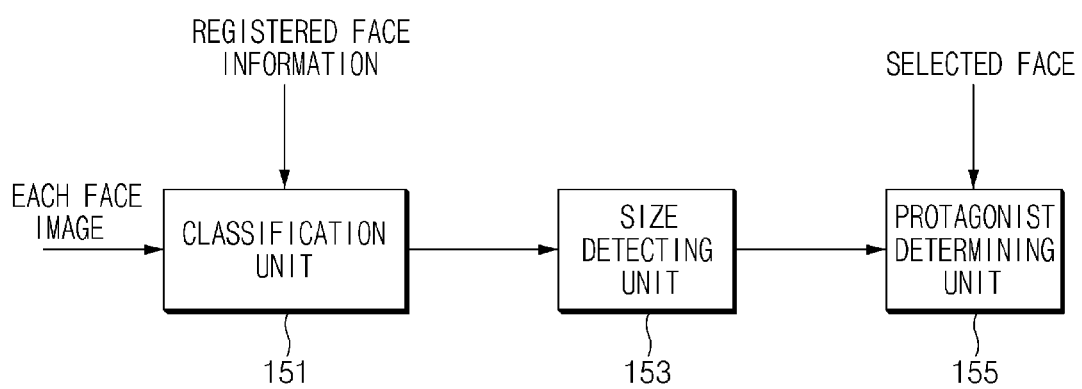
FIG. 2A illustrates a protagonist selecting unit, according to an embodiment of the present disclosure.

FIG. 2A illustrates a protagonist selecting unit, according to an embodiment of the present disclosure.

As illustrated in FIG. 2A, the protagonist selecting unit 150 may include the classification unit 151, a size detecting unit 153, and a protagonist determining unit 155.

According to an embodiment, the classification unit 151 may determine whether the registered face is in each face image, such as by extracting a feature value in each face image. If the extracted feature value of each face image is the same as the registered face feature value included in the storage unit 140, the classification unit 151 may determine that the corresponding face is the registered face. For example, the classification unit 151 may be a machine learning-based classifier that determines whether a face in each face image is the registered face, based on the feature value of each face image.

The size detecting unit 153 may detect the size of a face image in which there is no depth information. For example, the size detecting unit 153 may detect the size of the width and height of each face image with respect to the center of each face image.

The protagonist determining unit 155 may determine a protagonist, to which the greatest beauty effect is applied, in a face image based on at least one of depth information and size information of the width and height of each face image. For example, if at least one registered face is present, the protagonist determining unit 155 may determine, as the protagonist, a face which is the closest to a camera in at least one registered face image or of which the size is the greatest in at least one registered face image. The protagonist determining unit 155 may recognize the distance from the camera by using the depth information corresponding to each face image. As another example, if there is no registered face, the protagonist determining unit 155 may determine a face image, which is the closest to the camera in the face image or of which the size is the greatest in the face image, as the protagonist. As another example, if the face selected by a user is present, the protagonist determining unit 155 may determine the selected face as the protagonist. In this case, the protagonist determining unit 155, the classification unit 151, and the size detecting unit 153 may not separately perform processing for selecting the protagonist.

When the size of the largest face in the face image is not greater than a critical size, the protagonist determining unit 155 may not select the largest face as the protagonist even though the largest face is the face selected by a user and is the registered face. For example, the critical size may be experimentally set depending on the ratio of an area, which the largest face in the face image occupies, to the entire area of each image frame. For example, the critical size may be a size where the beauty effect is virtually indistinguishable by the user even though the beauty effect is applied thereto.

The protagonist determining unit 155 may output protagonist information including location information of the protagonist, may detect the size of each face image, and may output size information of the protagonist and another face.

Figure 2B:
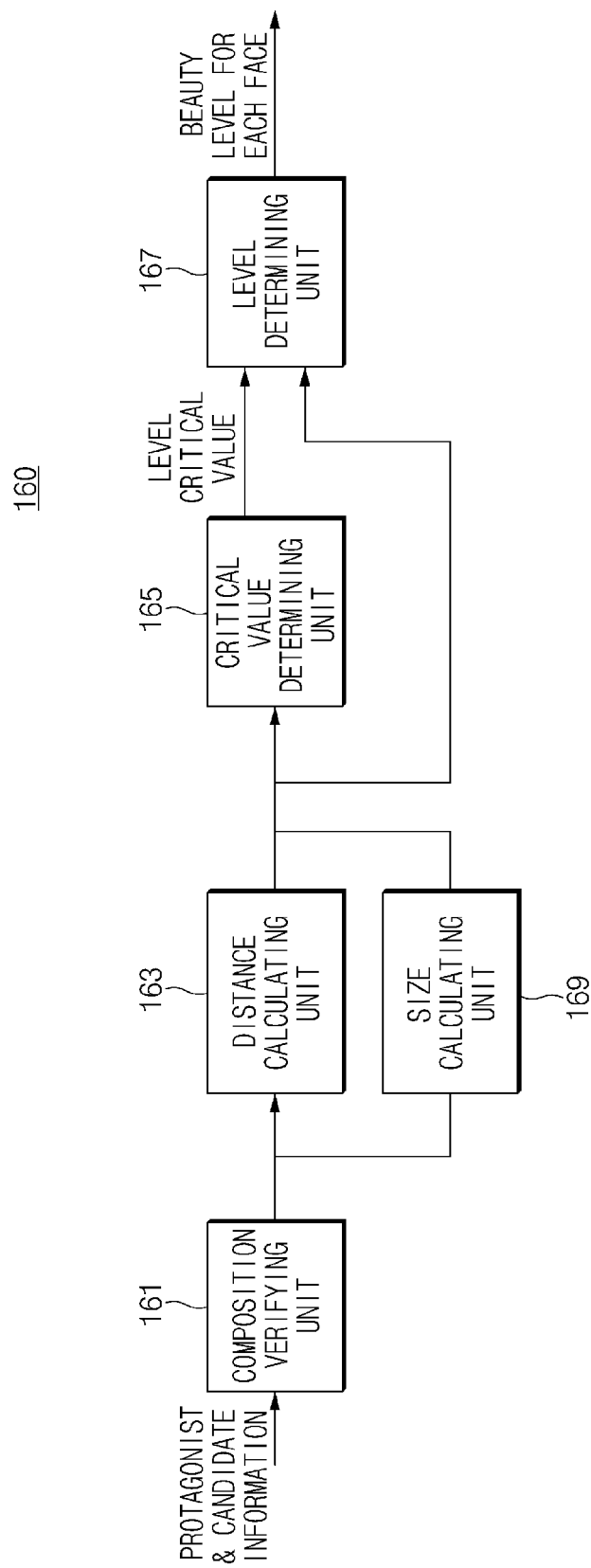
FIG. 2B illustrates a beauty level determining unit, according to an embodiment of the present disclosure.

FIG. 2B illustrates the beauty level determining unit 160, according to an embodiment of the present disclosure.

As illustrated in FIG. 2B, the beauty level determining unit 160 may include a composition verifying unit 161, a distance calculating unit 163, a size calculating unit 169, a critical value determining unit 165, and a level determining unit 167.

According to an embodiment, the composition verifying unit 161 may determine whether face images are of the composition of the horizontal line, by using coordinates of the detected plurality of face images. For example, if y-coordinates of all the detected face images are within a specified range, the composition verifying unit 161 may determine that each face image is of the composition of the horizontal line. The specified range may be determined by applying the beauty effect to the face image having the composition of the horizontal line. If at least one of y-coordinates of all the detected face images is not within the specified range, the composition verifying unit 161 may determine that the composition of each face image is not of the composition of the horizontal line.

The distance calculating unit 163 may calculate a relative distance from the protagonist of each face image. For example, when depth information corresponding to the face image is present, the distance calculating unit 163 may calculate the distance from the protagonist using the depth information. As another example, when the composition of each face image is not the composition of the horizontal line, the distance calculating unit 163 may calculate the relative distance of each face image by using x- and y-coordinates of each face image.

The size calculating unit 169 may calculate the size of each face image by multiplying the width size and the height size with respect to the coordinate of each face image. When each image frame always includes depth information or is associated with depth information, it may be unnecessary to calculate the size of each face image. In this case, the size calculating unit 169 may be omitted.

The critical value determining unit 165 may calculate a critical value of a relative level by using at least one of the maximum value of the relative distance (or the relative size) between each face and the protagonist and the total number of beauty levels to be applied. For example, the critical value determining unit 165 may determine the critical value of each beauty level by using the result of dividing the maximum value of the relative distance between each face and the protagonist by the total number of beauty levels. If the level determining unit 167 uses the critical value, such as a fixed constant of an absolute level, the critical value determining unit 165 may be omitted.

The level determining unit 167 may determine the beauty level of each face image by comparing the relative distance of each face image with the critical value of each beauty level. For example, the beauty level may correspond to the sharpness of the beauty effect, and the total number of beauty levels may be three (3). In this case, the level determining unit 167 may determine a beauty level, which is applied to a face image of which the relative distance is less than a first critical value, as a beauty level 1 of the maximum sharpness the same as the beauty level of the protagonist. The level determining unit 167 may determine a beauty level, which is applied to a face image of which the relative distance is greater than or equal to the first critical value and is less than a second critical value, as a beauty level 2 lower than the beauty level of the protagonist. The level determining unit 167 may determine a beauty level, which is applied to a face image of which the relative distance is greater than or equal to the second critical value, as a beauty level 3 of the lowest sharpness. As another example, the level determining unit 167 may determine the beauty level of each face image by comparing the relative size of each face image with a critical value of each level. Since the determining of the beauty level based on the relative size of each face image is nearly similar to the determining of the beauty level based on the relative distance of each face image, detailed descriptions thereof will be omitted.

In the meantime, when the relative distance from the protagonist calculated by the distance calculating unit 163 is greater than the specified maximum distance, the beauty level determining unit 160 may exclude the corresponding face image from a subject to which the beauty effect is applied.

Figure 3A:
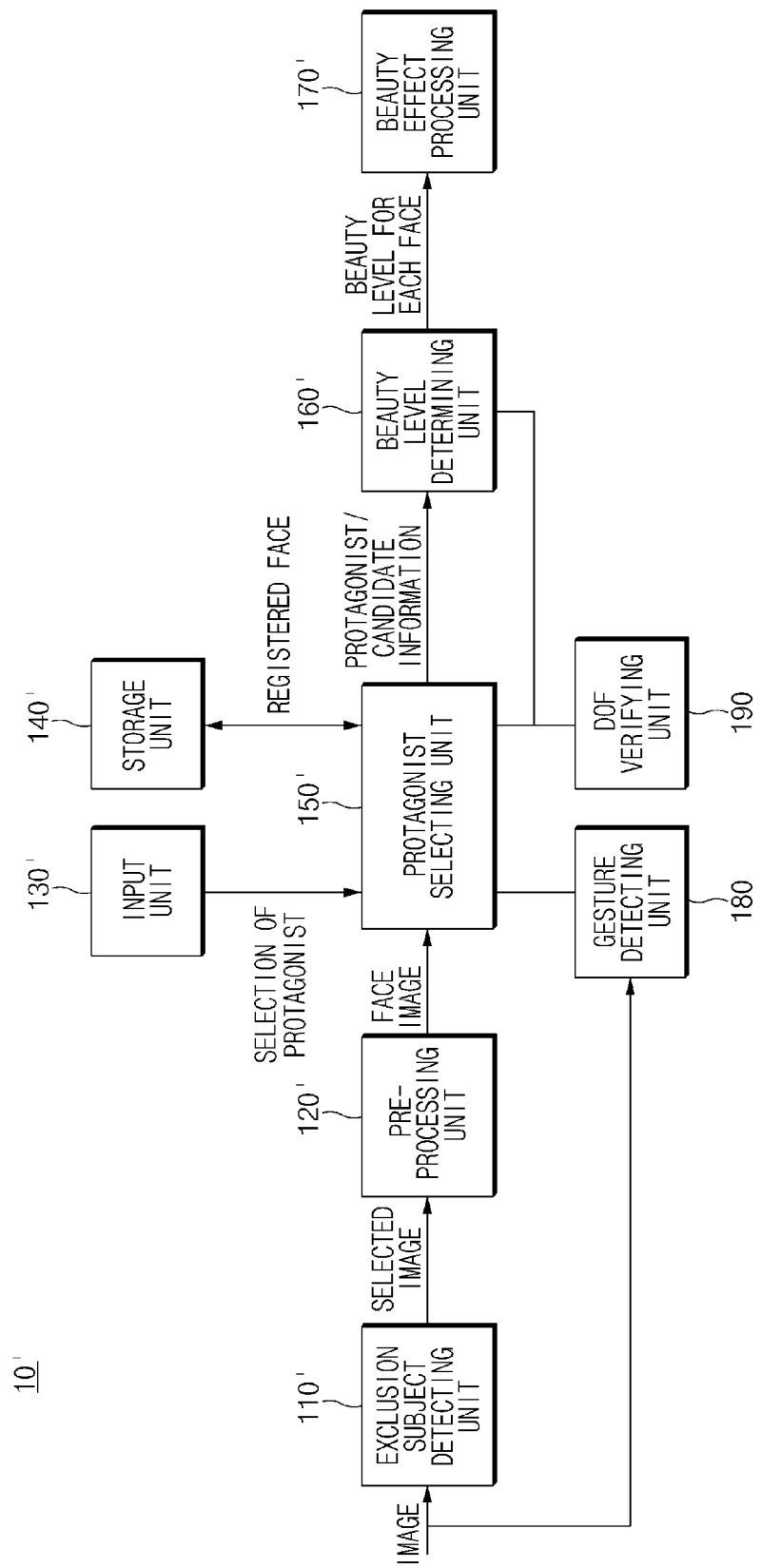
FIG. 3A illustrates a beauty effect processing apparatus, according to an embodiment of the present disclosure.

FIG. 3A illustrates a beauty effect processing apparatus, according to another embodiment of the present disclosure.

As illustrated in FIG. 3A, in addition to the beauty effect processing apparatus 10 in FIG. 1, a beauty effect processing apparatus 10' may further include a gesture detecting unit 180 and a depth of field (DOF) verifying unit 190 in addition to an excluded subject detecting unit 110', a pre-processing unit 120', an input unit 130', a storage unit 140', a protagonist selecting unit 150', a beauty level determining unit 160', and a beauty effect processing unit 170', which mostly correspond to the units in FIG. 1 except as described below. According to an embodiment, the gesture detecting unit 180 may determine whether the registered gesture is sensed, by analyzing a preview image frame. For example, the registered gesture may be a specific hand gesture, such as a 'V' gesture, or may be specific expression, such as a wink.

The DOF verifying unit 190 may verify the depth of each face image by using at least one of depth information, distance information, and a focus distance, by using a distance from the photographed subject sensed by a distance sensor, or by using the focus distance of a camera. When a camera has an auto focus function, the DOF verifying unit 190 may verify the focus distance from the camera. When a camera does not have the function of the auto focus, the DOF verifying unit 190 may focus on each face image and determine an area being in focus as DOF.

According to another embodiment, the protagonist selecting unit 150' may select the protagonist in the detected face image by using at least one of the input unit 130', a specific gesture, selection of a user, a registered face, or a face size and distance.

For example, when sensing that the subject makes a specific gesture toward the camera from the preview image frames, the protagonist selecting unit 150' may select the face image of subject taking the specific gesture as the protagonist. As another example, if sensing the specific subject, such as a hand, registered in a received frame, the protagonist selecting unit 150' may select the face image, which is the closest to the location of the specific subject, as the protagonist. Alternatively, the protagonist selecting unit 150' may select the face image, which is the closest to the depth of the camera, as the protagonist, or may select a face image of which the depth of the field is high and which is close to the camera, or a face image of which the face size is largest, as the protagonist.

The beauty level determining unit 160' may determine the beauty level with respect to the face image including the protagonist, such as the beauty level of the greatest sharpness with respect to the protagonist. The beauty level determining unit 160' may determine the beauty level with respect to a face image other than the protagonist based on a relative distance from the protagonist or the relative size of the protagonist.

The beauty level determining unit 160' may determine the beauty level further in consideration of the DOF of each face image or a degree of proximity to camera depth. For example, when each face image is a two-dimensional image, the beauty level determining unit 160' may verify the DOF of a face image including the protagonist, and may determine the beauty level of the face image having DOF, which is the same as the protagonist, as the same beauty level as that of the protagonist. As another example, the beauty level determining unit 160' may determine the beauty level in consideration of the degree of proximity to the camera DOF or the degree of separation of each face image.

Figure 3B:
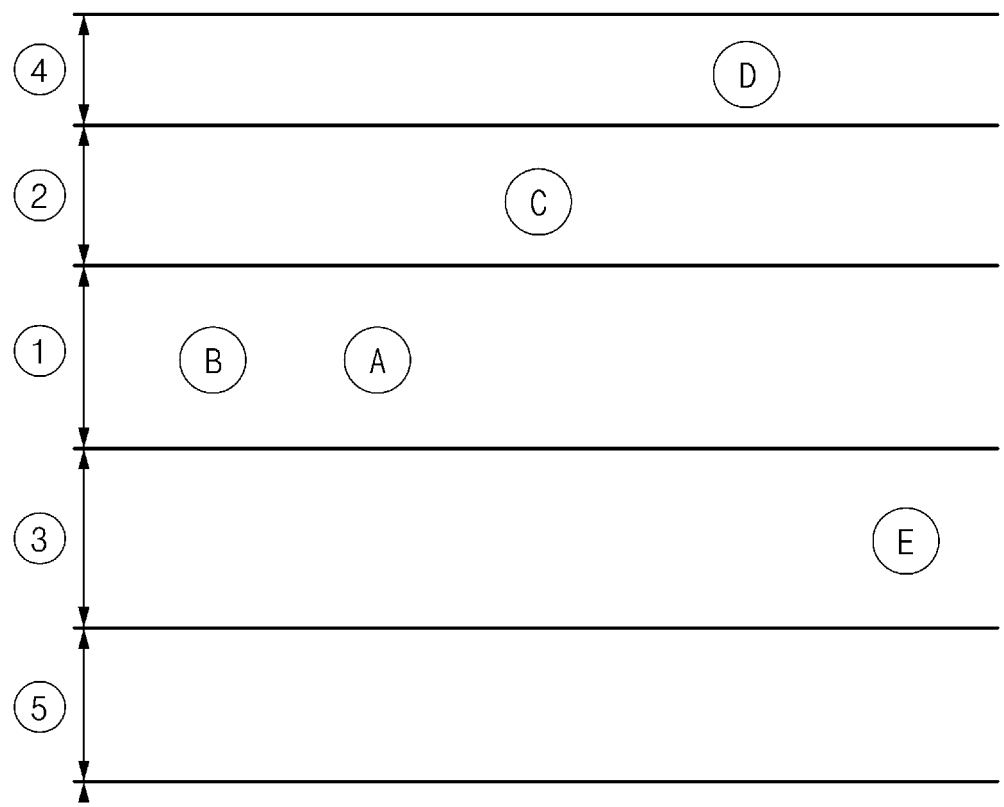
FIG. 3B is a view for describing a beauty level, according to another embodiment of the present disclosure.
Figure 3B:

FIG. 3B is a view for describing a beauty level, according to another embodiment of the present disclosure. In FIG. 3B, the determined beauty level will be described in connection with DOF of a camera.

The camera may clearly photograph a subject, which is to be photographed within the DOF related to the feature of the camera, and may photograph a relatively blurry shot of the subject, which is to be photographed out of the DOF. The DOF of the photographed image may discretely decrease depending on the extent to which the subject to be photographed is out of the DOF.

Referring to FIG. 3B, face images A, B, C, D, and E may be included in one image frame, and may be placed in areas in which the face images A and B, C, D, and E are respectively photographed with different DOFs. In FIG. 3B, ① is an area photographed with a first DOF that is the greatest DOF based on a feature of the camera, ② and ③ are areas photographed with a second DOF lower than the first DOF while being spaced apart from the DOF of the camera, and ④ and ⑤ are areas photographed with a third DOF lower than the second DOF while being further spaced apart from the DOF of the camera. Face images A and B placed in the first area within the DOF of the camera may be relatively clearly photographed compared with other face images, while face images C and E placed in a second area spaced apart from the DOF of the camera may be relatively blurred compared with the face images A and B. In addition, a face image D placed in a third area further spaced apart from the DOF of the camera may be even blurrier compared with the face images C and E.

In FIG. 3B, according to an embodiment, the protagonist selecting unit 150' may select as the protagonist a face image of which the size is the greatest or which is the closest to the camera, from among the face images A and B. For example, when face image A is closer to the camera than face image B, the protagonist selecting unit 150' may select face image A as the protagonist. As another example, when the distance between the camera and face image A is nearly similar to the distance between the camera and face image B, the protagonist selecting unit 150' may select a face image having the largest face size, from among the face images A and B as the protagonist.

The beauty level determining unit 160' may determine a beauty level, which is applied to a face image placed at the same DOF of the camera, as the same beauty level. For example, the beauty level determining unit 160' may determine the beauty levels of the face images A and B within the DOF related to the feature of the camera, as a level 1 at which the sharpness of the beauty level is the highest. The beauty level determining unit 160' may determine the beauty levels of the face images C and E, which are placed in an area photographed with the same DOF even though spaced distances from the camera are different from each other, as a level 2 of the moderate sharpness of the beauty effect. The beauty level determining unit 160' may determine the beauty level of the face image D, which is placed in an area photographed with the lowest DOF, as a level 3 of the least sharpness of the beauty effect. The beauty effect processing unit 170' may apply the beauty effect of the determined beauty level to each face image. That is, the beauty effect processing unit 170' may apply the beauty effect of level 1 to the face images A and B, may apply the beauty effect of level 2 to the face images C and E, and may apply the beauty effect of level 3 to the face image D.

Figure 4A:
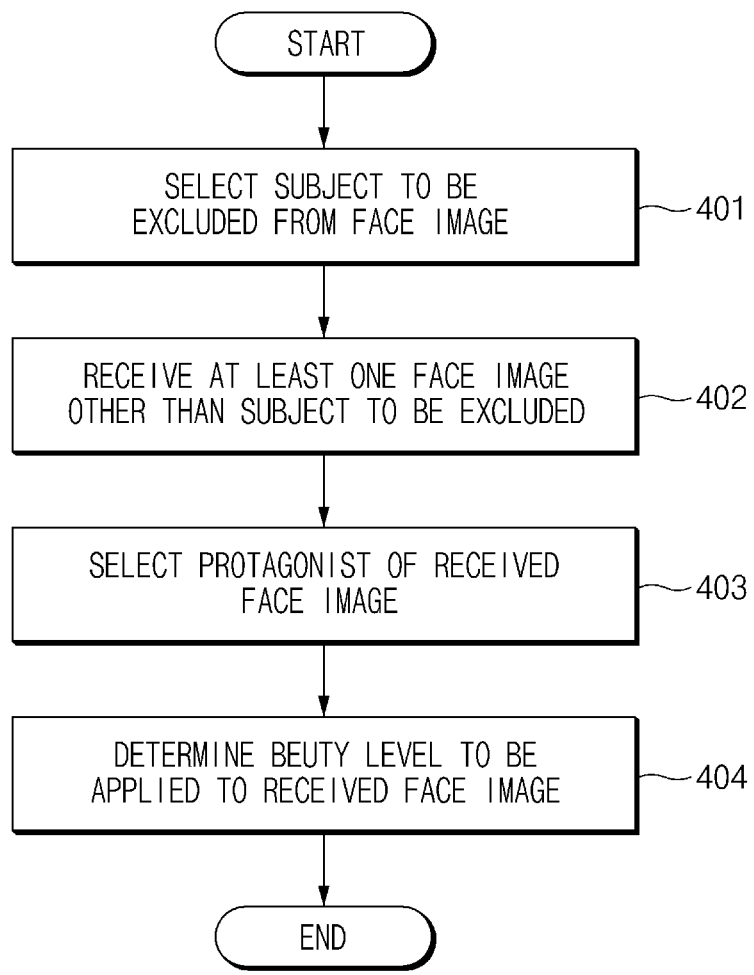
FIG. 4A illustrates a beauty effect processing method, according to an embodiment of the present disclosure.

FIG. 4A illustrates a beauty effect processing method, according to an embodiment of the present disclosure.

Figure 4B:
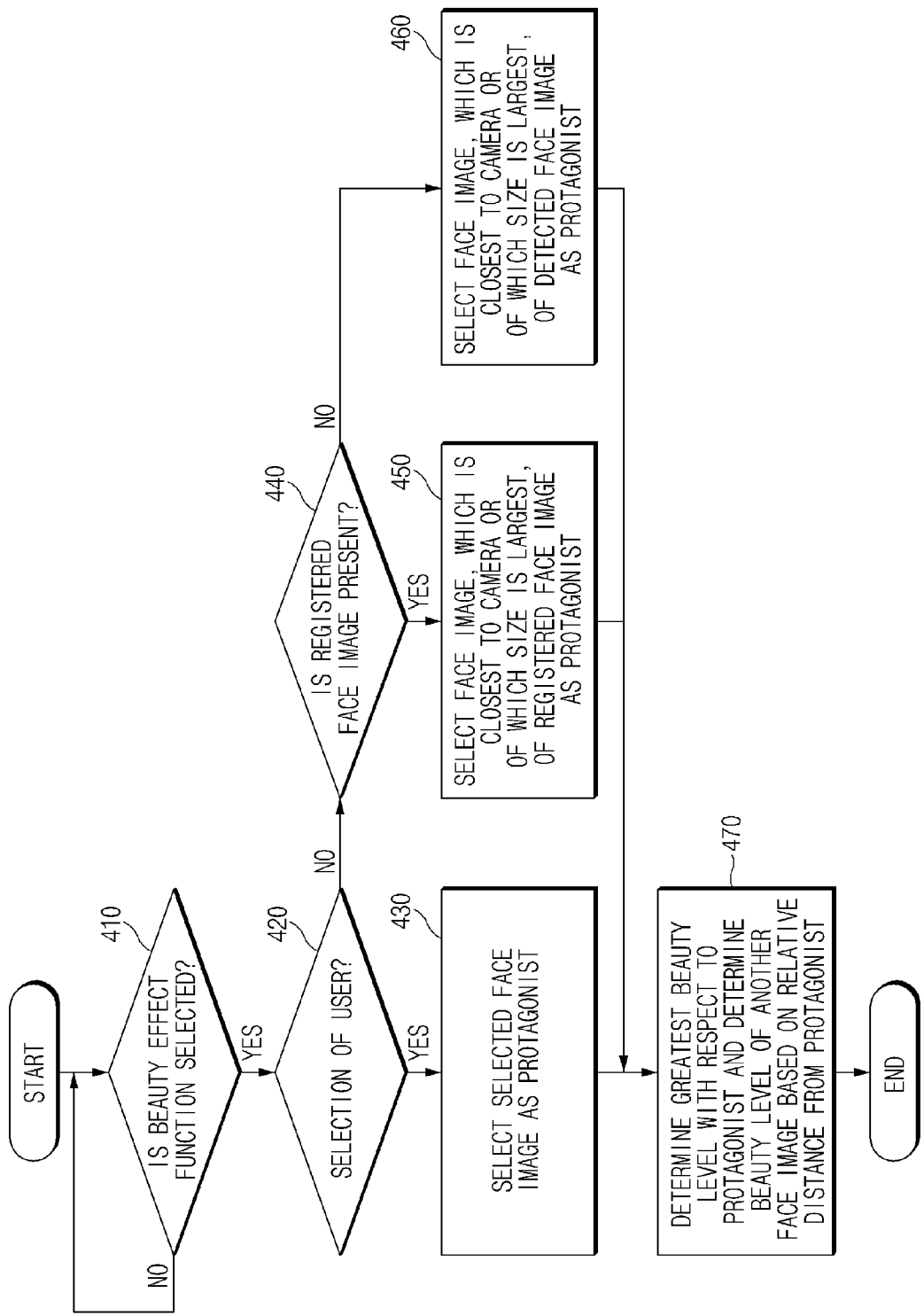
FIG. 4B illustrates a beauty effect processing method, according to an embodiment of the present disclosure.

Referring to FIG. 4B, in operation 401, the beauty effect processing apparatus may select a subject to be excluded, to which no beauty effect is applied, as a subject included in a face image extracted from each of image frames operation.

In operation 402, the beauty effect processing apparatus may receive at least one face image other than the subject to be excluded among the extracted face image.

In step 403, the beauty effect processing apparatus may select a protagonist, to which the beauty effect of the greatest sharpness is to be applied, of the received face image.

In operation 404, the beauty effect processing apparatus may determine a beauty level corresponding to sharpness of the beauty effect to be applied to the received face image based on at least one of a spaced distance from the protagonist and a face size in comparison with a face size of the protagonist.

FIG. 4B illustrates a beauty effect processing method, according to an embodiment of the present disclosure.

Referring to FIG. 4B, in operation 410, the beauty effect processing apparatus may determine whether a beauty effect function is selected. For example, a beauty effect function may be selected in a preview mode or a photographed image view mode. If the beauty effect function is not selected, operation 410 is repeated.

In operation 420, if the beauty effect function is selected, the beauty effect processing apparatus may determine whether the selection of a user has been made using at least one of the input unit 130, a specific gesture, and a specific subject with respect to an image frame. For example, the user manipulating the beauty effect processing apparatus may select a protagonist by selecting a screen during a preview through the input unit 130. As another example, when sensing that the subject makes a specific gesture toward the camera from image frames, the beauty effect processing apparatus may select a face of subject making the specific gesture as the protagonist. As another example, if sensing that the subject to be photographed selects a specific person, such as by using a hand, the beauty effect processing apparatus may select the face of the sensed specific person as the protagonist. The beauty effect processing apparatus may further provide a function of registering another body part (e.g., a palm) of a user or an object in addition to a face.

In operation 430, if the selection of the user is made, the beauty effect processing apparatus 10 may select the selected face image as the protagonist. For example, the beauty effect processing apparatus 10 may focus on the selected protagonist even when an image is photographed, and may perform image photographing.

In operation 440, if the selection of the user is not made, the beauty effect processing apparatus may determine whether the registered face image is present in the face image.

In operation 450, if the registered face image is present, the beauty effect processing apparatus may select a face image, which is the closest to a camera or of which the size is the largest, of the registered face image as the protagonist.

In operation 460, if the registered face image is not present, the beauty effect processing apparatus may select a face image, which is the closest to a camera or of which the size is the largest, of the detected face image as the protagonist.

In operation 470, the beauty effect processing apparatus may determine the greatest beauty level with respect to the protagonist and may determine the beauty level of another face image based on a relative distance from the protagonist or a relative size of the protagonist.

Figure 5:
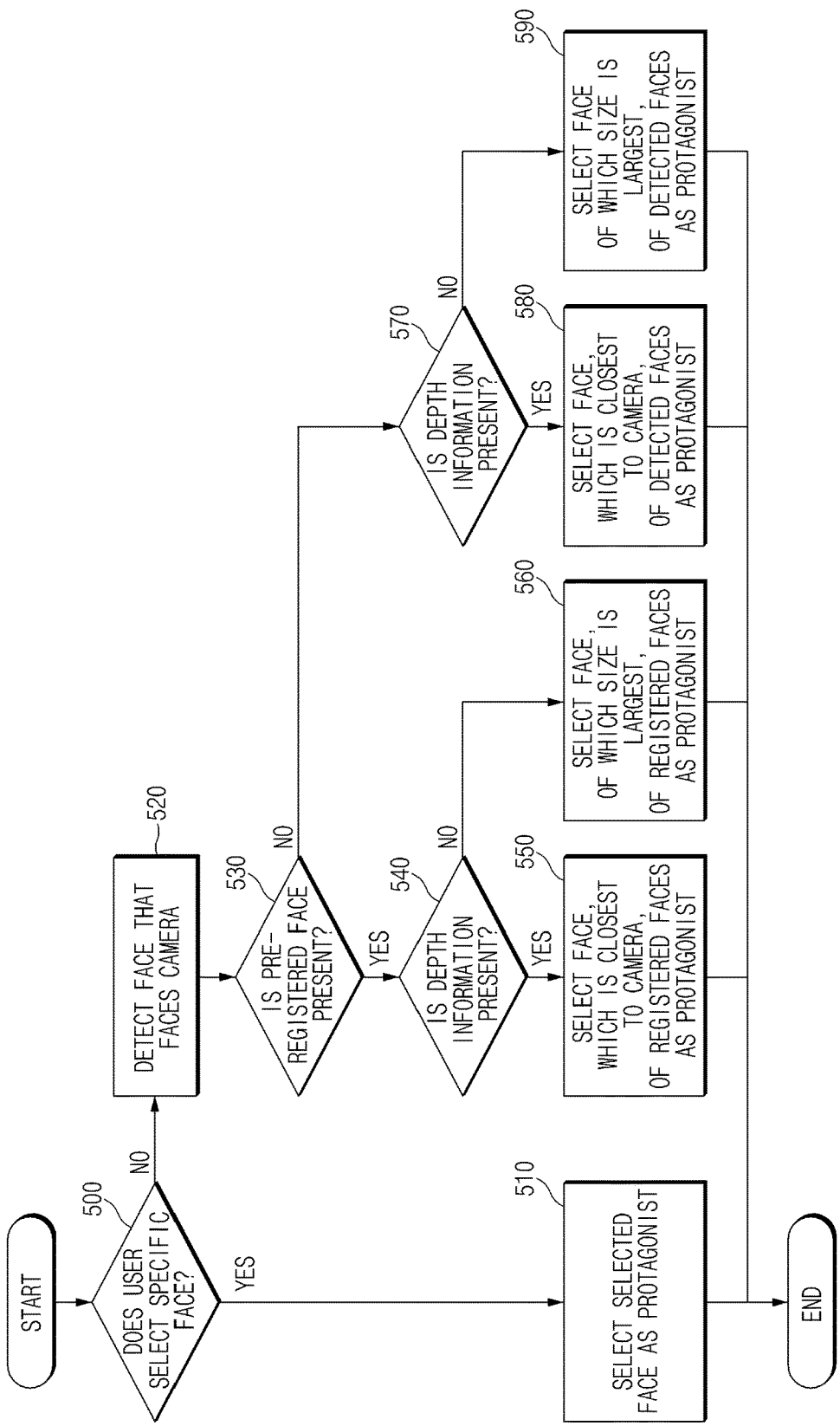
FIG. 5 illustrates a protagonist selecting method, according to an embodiment of the present disclosure.

FIG. 5 illustrates a protagonist selecting method, according to an embodiment of the present disclosure.

Referring to FIG. 5, in operation 500, the protagonist selecting unit may determine whether a specific face is selected by a user.

In operation 510, if the specific face is selected by the user, the protagonist selecting unit may select the selected face as a protagonist.

In operation 520, if the specific face is not selected by the user, the protagonist selecting unit may detect a face which faces a camera, of the detected faces.

In operation 530, the protagonist selecting unit 150 may determine whether there is a registered face of the detected faces.

In operation 540, if the registered face is present, the protagonist selecting unit may determine whether depth information is present in the face image.

In operation 550, if the depth information corresponding to the registered face is present, the protagonist selecting unit may select a face, which is the closest to a camera, of the registered face as the protagonist. In operation 550, the protagonist selecting unit may verify the distance from the camera based on the depth information.

In operation 560, if the depth information corresponding to the registered face is not present, the protagonist selecting unit may select a face, of which the size is the largest, of the registered faces as the protagonist.

In operation 570, if the registered faces are not present, the protagonist selecting unit may determine whether the depth information corresponding to each of the detected faces is present.

In operation 580, if the depth information corresponding to each of the detected faces is present, the protagonist selecting unit may select a face, which is the closest to the camera, of the detected faces based on the depth information as the protagonist.

In operation 590, if the depth information corresponding to each of the detected faces is not present, the protagonist selecting unit may select a face of which the size is the largest, of the detected faces as the protagonist.

According to an embodiment, the user's satisfaction with the beauty effect processing may be improved by selecting a subject (a protagonist), which has the greatest effect of applying the beauty effect, of faces included in each image frame.

Figure 6:
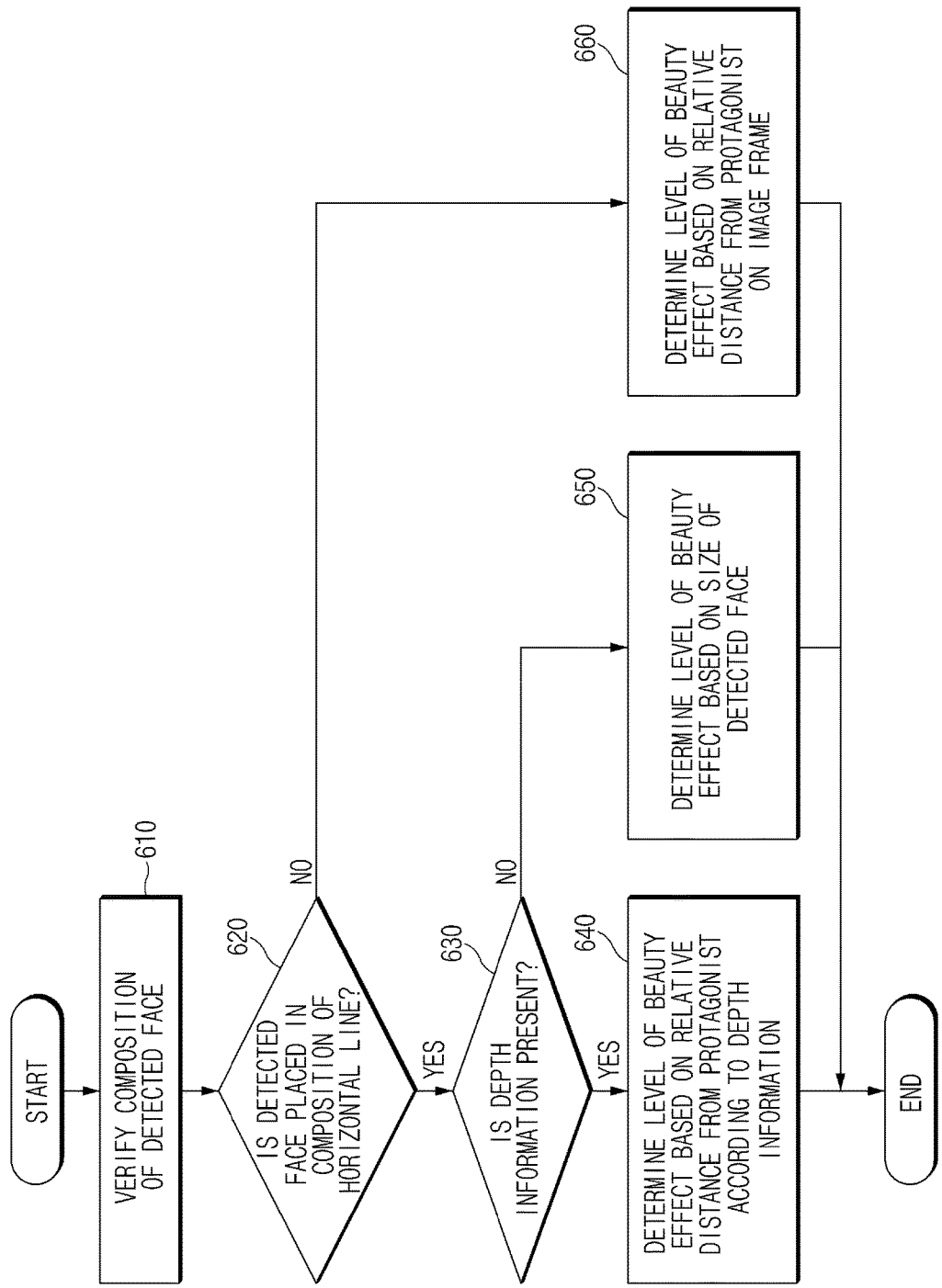
FIG. 6 illustrates a beauty level determining method, according to an embodiment of the present disclosure.

FIG. 6 illustrates a beauty level determining method, according to an embodiment of the present disclosure.

Referring to FIG. 6, in operation 610, the beauty level determining unit may verify the composition of a face included in each image frame by using the location of the detected face. For example, the beauty level determining unit may verify x- and y-coordinates of the detected face among all of the coordinates of the image frame and may verify the composition of a face included in each image frame by using the coordinates of the detected face.

In operation 620, the beauty level determining unit may determine whether the composition of the face included in each image frame is the composition of a horizontal line. For example, the beauty level determining unit may determine whether the detected face is of the composition of the horizontal line, based on at least one of the x- and y-coordinates of each face image, a face size, and distance information. As another example, when a value of a y-coordinate of the detected face varies within the critical distance, the beauty level determining unit may determine that the detected face is placed in the composition of the horizontal line.

In operation 630, if the composition of a face included in each image frame is the composition of the horizontal line, the beauty level determining unit may determine whether depth information corresponding to the detected face is present.

In operation 640, if the depth information corresponding to the detected face is present, the beauty level determining unit may determine a beauty level based on a relative distance corresponding to the depth information. For example, the beauty level determining unit may verify a difference of a depth value between the face of the protagonist and another face, and may calculate a relative distance of each face based on the verified difference of the depth value. The beauty level determining unit may compare the calculated relative distance of the each face image with a preset critical distance of each beauty level and may determine the level of the beauty effect of each face image based on the comparison result of the relative distance of each face image and the critical distance of each beauty level.

In operation 650, if the depth information corresponding to the detected face is not present, the beauty level determining unit may determine the level of the beauty effect based on the size of the detected face. For example, the beauty level determining unit may differently determine the beauty level based on a size difference between the detected face and the face of the protagonist. For example, when the size difference between the detected face and the face of the protagonist is less than a first critical size, the beauty level determining unit may determine the beauty level of the detected face as being the same as the beauty level of the protagonist. As another example, when the size difference between the detected face and the face of the protagonist is greater than or equal to the first critical size, the beauty level determining unit may determine the beauty level of the detected face as being less than the beauty level of the protagonist.

If the determined result of operation 620 indicates that the detected face is not placed in the composition of the horizontal line, in operation 660, the beauty level determining unit may differently determine the beauty level based on the relative distance from the protagonist on the image frame.

Figure 7:
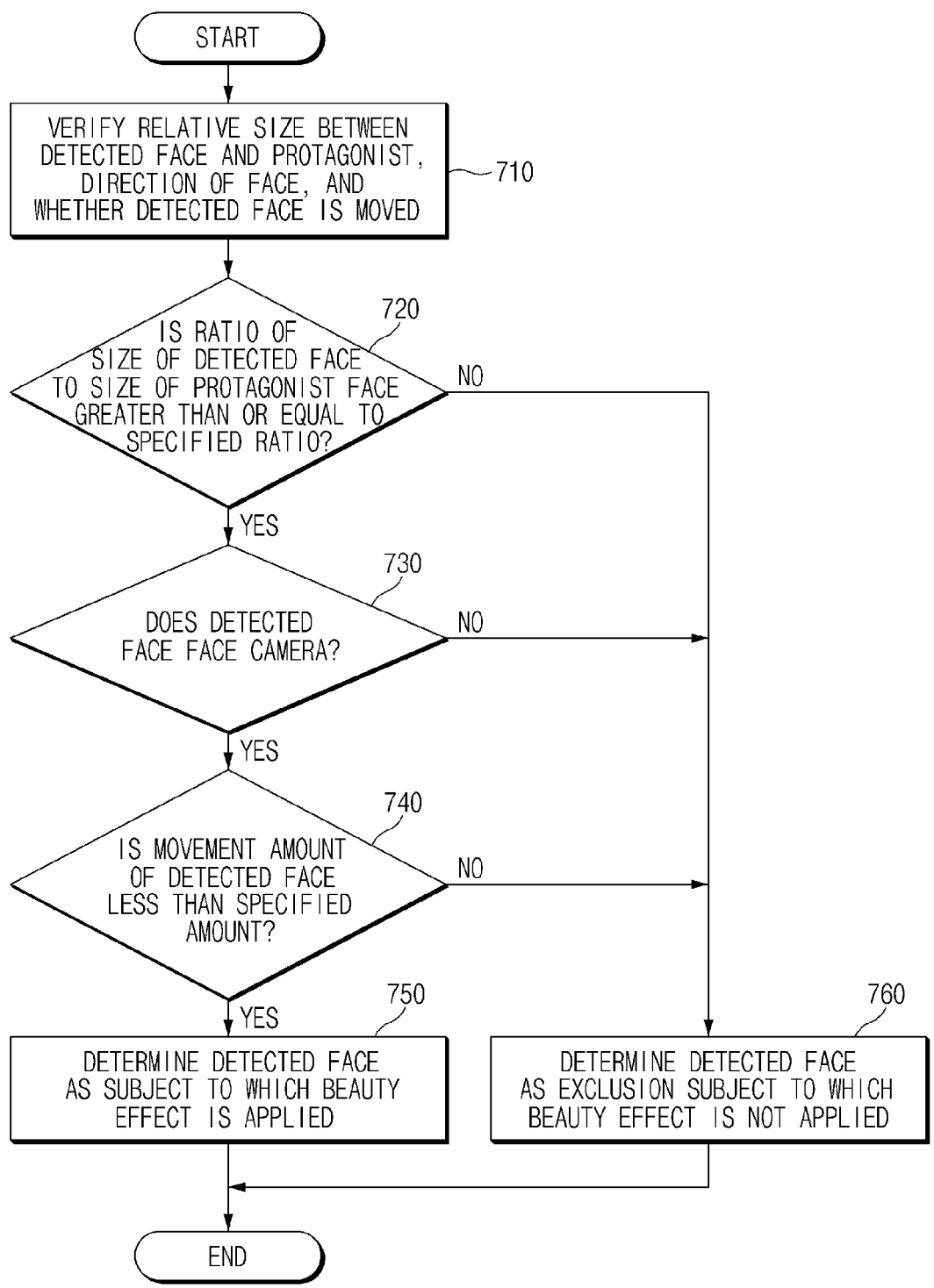
FIG. 7 illustrates a method of selecting a subject to which no beauty effect is applied, according to an embodiment of the present disclosure.

FIG. 7 illustrates a method of selecting a subject to which no beauty effect is applied (excluded), according to an embodiment of the present disclosure.

Referring to FIG. 7, in operation 710, the beauty effect processing apparatus may verify a relative size between the detected face and a protagonist, the direction of the detected face, and whether the detected face is moved. For example, the beauty effect processing apparatus may calculate a ratio of the size of the detected face to the size of the face of the protagonist by dividing the size of the detected face by the face size of the protagonist. As another example, the beauty effect processing apparatus may verify the direction of the detected face based on the location of at least one of an eye, a nose, or a mouth in the detected face. As another example, the beauty effect processing apparatus may determine whether the detected face is moved, by using a change in x- and y-coordinates of the face detected from each of a previous image frame and a current image frame.

In operation 720, the beauty effect processing apparatus may determine whether a ratio of the size of the detected face to the size of the protagonist face is greater than or equal to the specified ratio.

In operation 730, if the ratio of the size of the detected face to the size of the protagonist face is greater than or equal to the specified ratio, the beauty effect processing apparatus may determine whether the detected face faces the camera.

In operation 740, if the detected face faces the camera, the beauty effect processing apparatus may determine whether the movement amount of the detected face is less than a specified movement amount, which may be a size in which blur does not occur on the image frame during image photographing.

In operation 750, if the ratio of the size of the detected face to the size of the protagonist face is greater than or equal to the specified ratio, if the detected face faces the camera, and if the movement amount of the detected face is less than specified movement amount, the beauty effect processing apparatus may determine the detected face as the subject to which the beauty effect is applied.

In operation 760, if the ratio of the size of the detected face to the size of the protagonist face is less than the specified ratio, if the detected face does not face the camera, or if the movement amount of the detected face is greater than or equal to the specified movement amount, the beauty effect processing apparatus may determine the detected face as the excluded subject to which no beauty effect is applied.

According to an embodiment, an unnecessary arithmetic operation may be reduced from occurring and the satisfaction of the user with respect to beauty effect may be improved by excluding a subject having the slight beauty effect from subjects, even though the beauty effect is applied to the subject.

Figure 8:
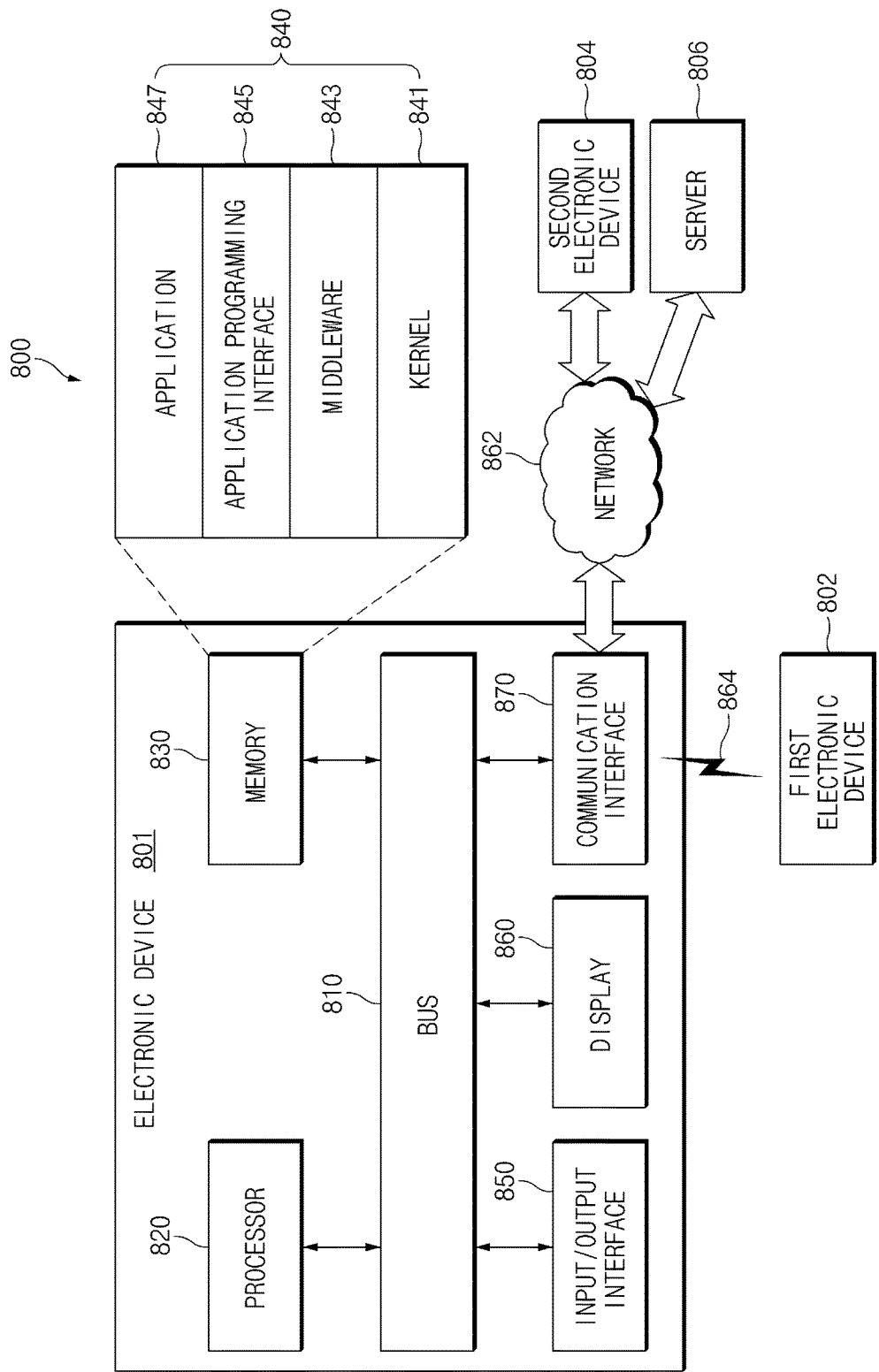
FIG. 8 illustrates an electronic device in a network environment, according to embodiments of the present disclosure.

FIG. 8 illustrates an electronic device in a network environment according to embodiments of the present disclosure.

Referring to FIG. 8, there is illustrated an electronic device 801 in a network environment 800, wherein the electronic device 801 may include a bus 810, a processor 820, a memory 830, an input/output interface 850, a display 860, and a communication interface 870. According to an embodiment, the electronic device 801 may not include at least one of the above-described elements or may further include other elements. The bus 810 may interconnect the above-described elements 810 to 870 and may be a circuit for conveying communications, such as a control message and/or data, among the above-described elements. The processor 820 may include one or more of a central processing unit (CPU), an application processor, and a communication processor (CP). For example, the processor 820 may perform an arithmetic operation or data processing associated with control and/or communication of at least one of other elements of the electronic device 801.

The memory 830 may include a volatile and/or nonvolatile memory. For example, the memory 830 may store instructions or data associated with at least one other component of the electronic device 801. According to an embodiment, the memory 830 may store software and/or a program 840 including a kernel 841, middleware 843, an application programming interface (API) 845, and/or applications 847. At least a part of the kernel 841, the middleware 843, and the API 845 may be referred to as an operating system (OS). For example, the kernel 841 may control or manage system resources, such as the bus 810, the processor 820, and the memory 830 that are used to execute operations or functions of other programs, such as the middleware 843, the API 845, and the application program 847. The kernel 841 may provide an interface that allows the middleware 843, the API 845, or the application program 847 to access discrete elements of the electronic device 801 so as to control or manage system resources.

The middleware 843 may perform a mediation role such that the API 845 or the applications 847 communicate with the kernel 841 to exchange data, and may process task requests received from at least one of the applications 847 according to a priority. For example, the middleware 843 may assign the priority, which enables use of a system resource of the electronic device 801, to at least one of the applications 847 and may process the task requests. The API 845 may be an interface through which at least one of the applications 847 controls a function provided by the kernel 841 or the middleware 843, and may include at least one interface or function for file control, window control, image processing, or character control. The input/output interface 850 may transfer an instruction or data input from a user or another external device, to other element(s) of the electronic device 801 or may output an instruction or data, received from other element(s) of the electronic device 801, to the user or the another external device.

The display 860 may include a liquid crystal display (LCD), a light-emitting diode (LED) display, an organic LED (OLED) display, a microelectromechanical systems (MEMS) display, or an electronic paper display, and may display various types of content, such as a text, an image, a video, an icon, or a symbol, to a user. The display 860 may include a touch screen and may receive a touch, gesture, proximity, or hovering input using an electronic pen or a part of a user's body. The communication interface 870 may establish communication between the electronic device 801 and an external electronic device, such as the first external electronic device 802, the second external electronic device 804, or the server 806. For example, the communication interface 870 may be connected to a network 862 through wireless communication or wired communication to communicate with the second external electronic device 804 or the server 806.

The wireless communication may include at least one of long term evolution (LTE), LTE advanced (LTE-A), code division multiple access (CDMA), wideband CDMA (WCDMA), universal mobile telecommunications system (UMTS), wireless broadband (WiBro), and global system for mobile communications (GSM) as a cellular communication. According to an embodiment, the wireless communication may include at least one of wireless fidelity (Wi-Fi), Bluetooth®, Bluetooth low energy (BLE), Zigbee®, near field communication (NFC), magnetic secure transmission (MST), radio frequency (RF), or a body area network (BAN). According to an embodiment, the wireless communication may include global navigation satellite system (GNSS). For example, the GNSS may be one of a global positioning system (GPS), a global navigation satellite system (Glonass), Beidou navigation satellite system (Beidou) or the European global satellite-based navigation system (Galileo). In this specification, "GPS" and "GNSS" may be interchangeably used. The wired communication may include at least one of a universal serial bus (USB), a high definition multimedia interface (HDMI), a recommended standard-232 (RS-232), a power line communication, or a plain old telephone service (POTS). The network 862 may include at least one of telecommunication networks a computer network, such as a local area network (LAN) or wide area network (WAN), the Internet, or a telephone network.

Each of the external first and second external electronic devices 802 and 804 may be the same type as or different type than the electronic device 801. According to embodiments, all or a part of operations that the electronic device 801 will perform may be executed by other electronic devices. When the electronic device 801 executes any function or service automatically or in response to a request, the electronic device 801 may not perform the function or the service internally, but instead, may request at least a part of a function associated with the electronic device 801 at one or more of the other devices, which may execute the requested function or additional function and may transmit the execution result to the electronic device 801. The electronic device 801 may provide the requested function or service using the received result or may additionally process the received result to provide the requested function or service. To this end cloud computing, distributed computing, or client-server computing may be used.

Figure 9:
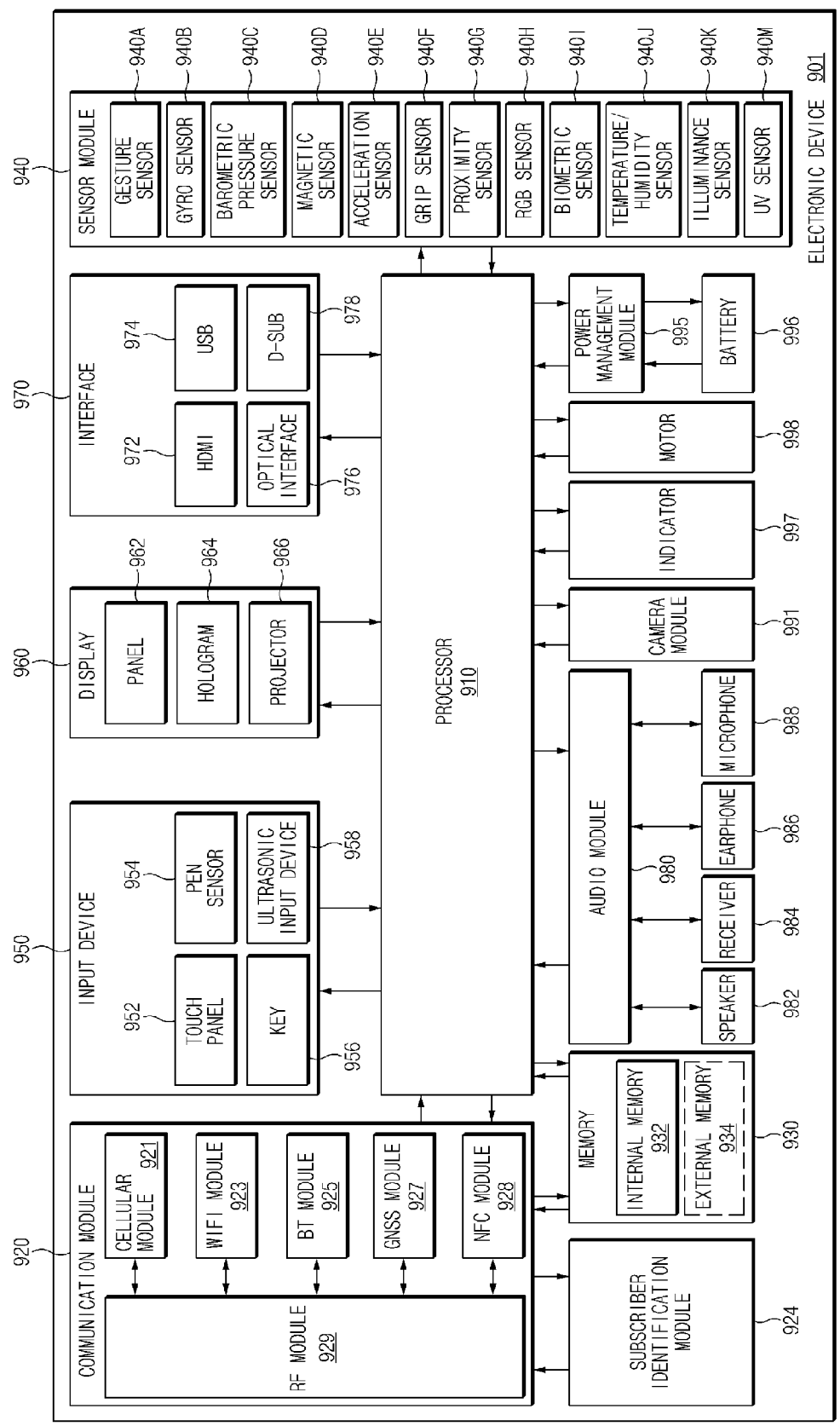
FIG. 9 illustrates an electronic device, according to embodiments of the present disclosure.

FIG. 9 illustrates a block diagram of an electronic device 901 according to embodiments of the present disclosure. The electronic device 901 may include all or a part of the electronic device 801 illustrated in FIG. 8, and may include one or more processors, such as an application processor 910, a communication module 920, a subscriber identification module (SIM) card 924, a memory 930, a sensor module 940, an input device 950, a display 960, an interface 970, an audio module 980, a camera module 991, a power management module 995, a battery 996, an indicator 997, and a motor 998. The processor 910 may drive an OS or an application to control a plurality of hardware or software elements connected to the processor 910 and may process and compute a variety of data. The processor 910 may be implemented with a system on chip (SoC), may further include a graphic processing unit (GPU) and/or an image signal processor, and may include at least a part of the elements illustrated in FIG. 9. The processor 910 may load an instruction or data, which is received from at least one of other elements, such as a nonvolatile memory, into a volatile memory and process the loaded instruction or data. The processor 910 may store a variety of data in the nonvolatile memory.

The communication module 920 may be configured the same as or similar to the communication interface 870 of FIG. 8, and may include the cellular module 921, a wireless fidelity (Wi-Fi) module 923, a Bluetooth® (BT) module 925, a GNSS module 927, an NFC module 928, and an RF module 929. The cellular module 921 may provide voice communication, video communication, a character service, or an Internet service over a communication network. According to an embodiment, the cellular module 921 may perform discrimination and authentication of the electronic device 901 within a communication network using the SIM card 924.

According to an embodiment, the cellular module 921 may perform at least a part of functions that the processor 910 provides, and may include a communication processor (CP). At least two of the cellular module 921, the Wi-Fi module 923, the BT module 925, the GNSS module 927, or the NFC module 928 may be included within one integrated circuit (IC) or an IC package. The RF module 929 may transmit and receive an RF communication signal, and may include a transceiver, a power amplifier module (PAM), a frequency filter, a low noise amplifier (LNA), or an antenna. According to another embodiment, at least one of the cellular module 921, the Wi-Fi module 923, the BT module 925, the GNSS module 927, or the NFC module 928 may transmit and receive an RF signal through a separate RF module. The SIM card 924 may include a card or embedded SIM that includes a subscriber identification module and may include unique identify information, such as integrated circuit card identifier (ICCID) or subscriber information, such as international mobile subscriber identity (IMSI).

The memory 930 may include an internal memory 932 and an external memory 934. For example, the internal memory 932 may include at least one of a volatile memory, such as a dynamic random access memory (DRAM), a static RAM (SRAM), or a synchronous DRAM (SDRAM), a nonvolatile memory, such as a one-time programmable read only memory (OTPROM), a programmable ROM (PROM), an erasable and programmable ROM (EPROM), an electrically erasable and programmable ROM (EEPROM), a mask ROM, a flash ROM, or a flash memory, a hard drive, or a solid state drive (SSD). The external memory 934 may include a flash drive, such as a compact flash (CF), secure digital (SD), micro secure digital (Micro-SD), mini secure digital (Mini-SD), extreme digital (xD), a multimedia card (MMC), or a memory stick. The external memory 934 may be operatively or physically connected to the electronic device 901 through various interfaces.

The sensor module 940 may measure a physical quantity or may detect an operation state of the electronic device 901, may convert the measured or detected information to an electric signal, and may include at least one of a gesture sensor 940A, a gyro sensor 940B, a barometric pressure sensor 940C, a magnetic sensor 940D, an acceleration sensor 940E, a grip sensor 940F, a proximity sensor 940G, a color sensor 940H, such as a red, green, blue (RGB) sensor, a biometric sensor 940I, a temperature/humidity sensor 940J, an illuminance sensor 940K, and an ultraviolet (UV) sensor 940M. The sensor module 940 may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor, and a control circuit for controlling at least one or more sensors included therein. According to an embodiment, the electronic device 901 may further include a processor which is part of or independent of the processor 910 and is configured to control the sensor module 940 while the processor 910 remains at a sleep state.

The input device 950 may include a touch panel 952, a (digital) pen sensor 954, a key 956, and an ultrasonic input unit 958. The touch panel 952 may use at least one of capacitive, resistive, infrared, and ultrasonic detecting methods, and may further include a control circuit and a tactile layer to provide a tactile reaction to a user. The (digital) pen sensor 954 may be a part of a touch panel or may include an additional sheet for recognition. The key 956 may include a physical button, an optical key, or a keypad. The ultrasonic input device 958 may sense an ultrasonic signal, which is generated from an input device, through a microphone 988 and may check data corresponding to the detected ultrasonic signal.

The display 960 may include a panel 962, a hologram device 964, and a projector 966, and a control circuit to control the panel 962, the hologram device 964, and the projector 966. The panel 962 may be implemented to be flexible, transparent or wearable, may be integrated into one or more modules, and may include a pressure sensor (or a force sensor) which is capable of measuring an intensity of a pressure with respect to a touch of a user. The pressure sensor and the touch panel 952 may be implemented integrally or with one or more sensors independent of the touch panel 952. The hologram device 964 may display a stereoscopic image in a space using a light interference phenomenon. The projector 966 may project light onto a screen so as to display an image. The screen may be arranged inside or outside of the electronic device 901. The interface 970 may include a high-definition multimedia interface (HDMI) 972, a universal serial bus (USB) 974, an optical interface 976, and a D-subminiature (D-sub) 978, may be included in the communication interface 870 illustrated in FIG. 8, and may include a mobile high definition link (MHL) interface, a secure digital (SD) card/multi-media card (MMC) interface, and an infrared data association (IrDA) standard interface.

The audio module 980 may convert a sound and an electric signal in dual directions. At least a part of the audio module 980 may be included in the input/output interface 850 illustrated in FIG. 8. The audio module 980 may process sound information that is input or output through a speaker 982, a receiver 984, earphones 986, or the microphone 988. The camera module 991 for shooting a still image or a video may include at least one image sensor, such as a front sensor or a rear sensor, a lens, an image signal processor (ISP), or a flash, such as a light emitting diode (LED) or a xenon lamp.

The power management module 995 may manage power of the electronic device 901 and may include a power management integrated circuit (PMIC), a charger IC, or a battery gauge. The PMIC may have a wired charging method, and/or a wireless charging method such as magnetic resonance, magnetic induction or an electromagnetic method and may further include an additional circuit, such as a coil loop, a resonant circuit, or a rectifier. The battery gauge may measure a remaining capacity of the battery 996 and a voltage, current or temperature thereof while the battery is charged. The battery 996 may include a rechargeable battery and/or a solar battery.

The indicator 997 may display a specific state of the electronic device 901 or a part thereof, such as a booting, message, or charging state. The motor 998 may convert an electrical signal into a mechanical vibration and may generate vibration or haptic effects. The electronic device 901 may include a device, such as GPU, for supporting the mobile TV that processes media data according to the standards of digital multimedia broadcasting (DMB), digital video broadcasting (DVB), or MediaFlo™. Each of the above-mentioned elements may be configured with one or more components, and the names of the elements may be changed according to the type of the electronic device. In embodiments, the electronic device 901 may omit some elements or may further include additional elements. Some of the elements of the electronic device may be combined with each other so as to form one entity, so that the functions of the elements may be performed in the same manner as before the combination.

Figure 10:
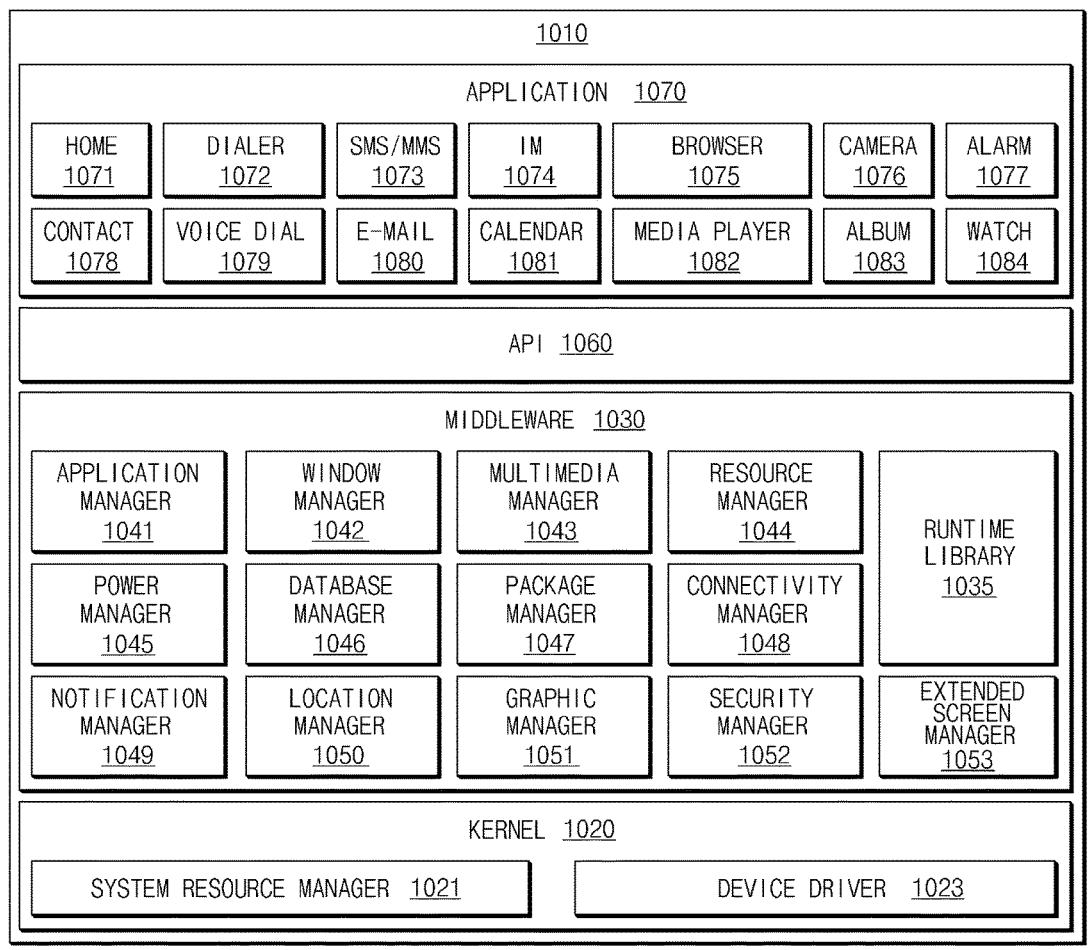
FIG. 10 is a block diagram of a program module, according to embodiments of the present disclosure.

FIG. 10 is a block diagram of a program module according to embodiments of the present disclosure. In FIG. 10, a program module 1010 may include an operating system to control resources associated with an electronic device, and/or diverse applications driven on the OS, which may include Android™, iOS™, Windows™, Symbian™, Tizen™, or Bada™. The program module 1010 may include a kernel 1020, middleware 1030, an application programming interface (API) 1060, and applications 1070. At least a part of the program module 1010 may be preloaded on an electronic device or may be downloadable from an external electronic device.

The kernel 1020 may include a system resource manager 1021 and/or a device driver 1023. The system resource manager 1021 may perform control, allocation, or retrieval of system resources, and may include a process managing part, a memory managing part, and a file system managing part. The device driver 1023 may include a display driver, a camera driver, a Bluetooth driver, a common memory driver, a USB driver, a keypad driver, a Wi-Fi driver, an audio driver, and an inter-process communication (IPC) driver. The middleware 1030 may provide a function that at least one of the applications 1070 needs in common, or may provide diverse functions to the applications 1070 through the API 1060 to allow the applications 1070 to efficiently use limited system resources of the electronic device. According to an embodiment, the middleware 1030 may include at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, a security manager 1052, and an extended screen manager 1053.

The runtime library 1035 may include a library module that is used by a compiler to add a new function through a programming language while at least one of the applications 1070 is being executed. The runtime library 1035 may perform input/output management, memory management, or arithmetic functions. The application manager 1041 may manage a life cycle of the applications 1070. The window manager 1042 may manage a GUI resource that is used in a screen. The multimedia manager 1043 may identify a format necessary for playing media files and may perform encoding or decoding of media files by using a codec suitable for the format. The resource manager 1044 may manage source code of the applications 1070 or a storage space. The power manager 1045 may manage a battery capacity or power and may provide power information for an operation of an electronic device. According to an embodiment, the power manager 1045 may operate with a basic input/output system (BIOS). The database manager 1046 may generate, search for, or modify database which is to be used in the applications 1070, for example. The package manager 1047 may install or update an application that is distributed in the form of package file.

The connectivity manager 1048 may manage wireless connection. The notification manager 1049 may provide an event such as arrival message, appointment, or proximity notification. The location manager 1050 may manage location information about an electronic device. The graphic manager 1051 may manage a graphic effect that is provided to a user, or manage a user interface relevant thereto. The security manager 1052 may provide system security or user authentication. The extended screen manager 1053 may determine an area of the display at which the graphic is displayed, and may manage information to be provided through the area of the display at which the graphic is displayed, a graphic effect or a user interface relevant thereto.

The middleware 1030 may include a telephony manager for managing a voice or video call function of the electronic device or a middleware module which is capable of forming a combination of functions of the above-described elements. The middleware 1030 may provide a module specialized to each OS type, and may dynamically remove a part of the preexisting elements or may add new elements thereto. The API 1060 may be a set of programming functions and may be provided with another configuration which is variable depending on an OS. For example, when the OS is Android or iOS, it may be permissible to provide one API set per platform. When an OS is Tizen, it may be permissible to provide two or more API sets per platform.

The applications 1070 may include a home 1071, dialer 1072, short message service/multimedia messaging service (SMS/MMS) 1073, instant message (IM) 1074, browser 1075, camera 1076, alarm 1077, contact 1078, voice dial 1079, e-mail 1080, calendar 1081, media player 1082, album 1083, watch 1084, and health care application, such as for measuring an exercise quantity or blood sugar, or an application offering environment information, such as information of barometric pressure, humidity, and temperature.

The applications 1070 may include an information exchange application to support information exchange between an electronic device and an external electronic device. The information exchanging application may include a notification relay application for transmitting specific information to the external electronic device, or a device management application for managing the external electronic device. For example, the notification relay application may transmit notification information, which arises from other applications of the electronic device, to the external electronic device or may receive notification information from the external electronic device and provide the notification information to a user. The device management application may install, delete, or update a function, such as for turn-on/turn-off of at least part of the external electronic device itself or adjustment of display resolution of the external electronic device which communicates with the electronic device or an application running in the external electronic device.

The applications 1070 may include a health care application of a mobile medical device that is assigned in accordance with an attribute of the external electronic device, and an application which is received from the external electronic device. At least a portion of the program module 1010 may be executed by software, firmware, hardware, or a combination of two or more thereof and may include modules, programs, routines, sets of instructions, and processes for performing one or more functions.

According to embodiments of the present disclosure, the effectiveness of a beauty effect applied to a face included in an image frame may increase.

While the present disclosure has been described with reference to accompanying drawings in detail, it will be understood by those skilled in the art that various changes and modifications may be made without departing from the scope of the present disclosure. The embodiments should be considered in descriptive sense only and not for purposes of limitation. Therefore, the scope of the present disclosure is defined not by the detailed description of the present disclosure but by the appended claims and their equivalents.

What is claimed is:

1. A beauty effect processing apparatus comprising:
    an excluded subject detecting unit configured to select a subject to be excluded, to which no beauty effect is applied, of at least one face image extracted from each of image frames;
    a protagonist selecting unit configured to receive at least one face image other than the subject to be excluded among the at least one extracted face image and to select a protagonist, to which the beauty effect having a maximum sharpness is to be applied, among the received at least one face image; and
    a beauty level determining unit configured to determine a beauty level corresponding to sharpness of the beauty effect to be applied to each of the received at least one face image based on at least one of a spaced distance from the protagonist and a face size of the received at least one face image relative to a face size of the protagonist.

2. The beauty effect processing apparatus of claim 1, wherein the excluded subject detecting unit selects a subject included in each of the image frames or the extracted face image as the subject to be excluded, in at least one of when movement of the subject in each of the image frames or the extracted face image included is greater than or equal to the critical movement amount, when a face of the subject included in each of the image frames or the extracted face image does not face a camera, when an edge change is greater than or equal to a critical change amount, and when the face having a size that is less than a critical size, is included.

3. The beauty effect processing apparatus of claim 1, wherein the protagonist selecting unit selects, as the protagonist, an image of a face which is closest in distance to a camera or which has a largest size, from among the at least one received face image.

4. The beauty effect processing apparatus of claim 3, wherein the protagonist selecting unit determines whether at least one registered face image is present in the received face image, based on machine learning by a classification unit, and selects one, which is closest to the camera or which has the largest size, of the at least one registered face image as the protagonist when the at least one registered face image is present.

5. The beauty effect processing apparatus of claim 1, wherein the protagonist selecting unit selects the protagonist by selecting a face image, which is closest in distance to a camera, of the received at least one face image using depth information, when the depth information corresponding to the received at least one face image is present.

6. The beauty effect processing apparatus of claim 1, wherein the protagonist selecting unit selects as the protagonist a face having a largest size, of the face images, when no depth information corresponding to each of the face images is present.

7. The beauty effect processing apparatus of claim 1, wherein when a face image, which is selected from each of the image frames, is present, the protagonist selecting unit selects the selected face image as the protagonist.

8. The beauty effect processing apparatus of claim 1, further comprising:
    a gesture sensing unit configured to sense a gesture of a user by the image frames,
    wherein, when a specified gesture is sensed through the gesture sensing unit, the protagonist selecting unit sets a face image of a subject making the sensed gesture to the protagonist.

9. The beauty effect processing apparatus of claim 1, wherein the beauty level determining unit determines the beauty level such that the sharpness of the beauty effect decreases as the spaced distance from the protagonist increases, or as the size ratio relative to the protagonist decreases, if all of y-coordinates of the face images are within a specified range.

10. The beauty effect processing apparatus of claim 1, wherein the beauty level determining unit determines the beauty level such that the sharpness of the beauty effect decreases as a spaced distance from the protagonist based on a coordinate of the received face image increases, when at least one of all y-coordinates of the face images is not within a specified range.

11. The beauty effect processing apparatus of claim 1, wherein when a ratio of a size of a face image to the face size of the protagonist is less than a critical ratio, the beauty level determining unit selects the face image as the subject to be excluded.

12. The beauty effect processing apparatus of claim 1, wherein the beauty level determining unit verifies a depth of field of the received face image or a degree of proximity to the depth of field, and determines the beauty level having a maximum beauty effect sharpness as the depth of field or the degree of proximity increases.

13. The beauty effect processing apparatus of claim 1, further comprising:
a beauty effect processing unit configured to apply the beauty effect to the received at least one face image with the sharpness of the beauty effect corresponding to the beauty level.

14. The beauty effect processing apparatus of claim 1, further comprising:
a pre-processing unit configured to extract all face images included in each of the image frames from a photographed image or a preview image.

15. A beauty effect processing method by at least one processor, the method comprising:
selecting a subject to be excluded, to which no beauty effect is applied, of a subject included in a face image extracted from each of image frames;
receiving at least one face image other than the subject to be excluded among the extracted face image;
selecting a protagonist, to which the beauty effect having a maximum sharpness is to be applied, of the received at least one face image; and
determining a beauty level corresponding to sharpness of the beauty effect to be applied to the received at least one face image based on at least one of a spaced distance from the protagonist and a face size of the received at least one face image relative to a face size of the protagonist.

16. The method of claim 15, wherein selecting the subject to be excluded includes:
selecting the subject included in each of the image frames or the extracted face image as the excluded subject in at least one of when movement of the subject in each of the image frames or the extracted face image included is greater than or equal to the critical movement amount, when a face of the subject included in each of the image frames or the extracted face image does not face a camera, when an edge change is greater than or equal to a critical change amount, and when the face having a size that is less than a critical size, is included.

17. The method of claim 15, wherein selecting the protagonist includes:
determining whether at least one registered face image is present in the received at least one face image; and
selecting one, which is closest in distance to the camera or which has a largest size, of the at least one registered face image as the protagonist when the at least one registered face image is present.

18. The method of claim 15, wherein selecting the protagonist includes:
determining whether depth information corresponding to each of the face images is present;
selecting a face, which is closest in distance to a camera, of the face images using the depth information and selecting the selected face as the protagonist when the depth information is present; and
selecting a face having a largest size, of the face images as the protagonist when no depth information is present.

19. The method of claim 15, wherein determining the beauty level includes:
determining whether all of y-coordinates of the face images are within a specified range;
determining the beauty level such that the sharpness of the beauty effect decreases as a spaced distance from the protagonist increases or as a size ratio decreases, when the determined result indicates that all the y-coordinates of the face images are within the specified range; and
determining the beauty level such that the sharpness of the beauty effect decreases as a spaced distance from the protagonist that is based on a coordinate of the received at least one face image increases, when the determined result indicates that at least one of the y-coordinates of the face images is not within the specified range.

20. The method of claim 15, wherein determining the beauty level includes:
verifying a depth of field of the received face image or a degree of proximity to the depth of field; and
determining the beauty level having a maximum beauty effect sharpness as the depth of field or the degree of proximity increases.

* * * * *